United States Patent
Shi et al.

(10) Patent No.: US 10,615,935 B2
(45) Date of Patent: Apr. 7, 2020

(54) TRANSMISSION METHOD AND CONFIGURATION METHOD FOR DOWNLINK CONTROL CHANNEL, AND TERMINAL AND BASE STATION

(71) Applicant: ZTE CORPORATION, Shenzhen, Guangdong (CN)

(72) Inventors: Jing Shi, Guangdong (CN); Bo Dai, Guangdong (CN); Shuqiang Xia, Guangdong (CN); Huiying Fang, Guangdong (CN); Kun Liu, Guangdong (CN); Xianming Chen, Guangdong (CN); Wen Zhang, Guangdong (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 15/574,415

(22) PCT Filed: Mar. 16, 2016

(86) PCT No.: PCT/CN2016/076516
§ 371 (c)(1),
(2) Date: Nov. 15, 2017

(87) PCT Pub. No.: WO2016/184239
PCT Pub. Date: Nov. 24, 2016

(65) Prior Publication Data
US 2018/0139024 A1 May 17, 2018

(30) Foreign Application Priority Data
May 15, 2015 (CN) .......................... 2015 1 0251201

(51) Int. Cl.
*H04L 5/00* (2006.01)
*H04W 4/70* (2018.01)
(Continued)

(52) U.S. Cl.
CPC .............. *H04L 5/0053* (2013.01); *H04W 4/70* (2018.02); *H04W 72/048* (2013.01); *H04W 74/006* (2013.01)

(58) Field of Classification Search
CPC ........... H04L 5/0053; H04L 1/00; H04W 4/70
See application file for complete search history.

(56) References Cited

U.S. PATENT DOCUMENTS

2011/0105050 A1* 5/2011 Khandekar ............. H04L 5/001
455/68
2011/0292891 A1* 12/2011 Hsieh ...................... H04L 5/001
370/329
(Continued)

FOREIGN PATENT DOCUMENTS

| CN | 101699901 A | 4/2010 |
|----|-------------|--------|
| CN | 102215586 A | 10/2011 |
| CN | 104349458 A | 2/2015 |

OTHER PUBLICATIONS

International Search Report dated Jun. 12, 2016 for International Application No. PCT/CN2016/076516, 7 pages.
(Continued)

*Primary Examiner* — Jael M Ulysse
(74) *Attorney, Agent, or Firm* — Knobbe Martens Olson & Bear LLP

(57) ABSTRACT

A transmission method and a configuration method for a downlink control channel, a terminal, a base station and a computer storage medium are provided. The transmission method for the downlink control channel includes: performing, by a terminal, a blind detection on the downlink control channel according to a maximum number (N_total) of candidates in a repeated transmission. The N_total meets one of the following conditions: the N_total is not greater than a total number N_legacy of candidates of a single subframe of a transmission terminal (legacy UE) of a long-term evolution (LTE) system; the N_total is N_legacy×Y which is a product of the N_legacy and a maximum value Y of types of repeat times for performing the blind detection on the downlink control channel; and the N_total ranges from the N_legacy to the N_legacy×Y.

18 Claims, 2 Drawing Sheets

Determine a maximum number of candidates of the downlink control channel in repeated transmission by a terminal — 101

Perform blind detect on the downlink control channel by the terminal based on the maximum number of the candidates in the repeated transmission — 102

(51) Int. Cl.
*H04W 72/04* (2009.01)
*H04W 74/00* (2009.01)

(56) References Cited

U.S. PATENT DOCUMENTS

| | | | |
|---|---|---|---|
| 2012/0028668 A1* | 2/2012 | Lee | H04L 5/0053 455/509 |
| 2012/0155316 A1* | 6/2012 | Li | H04W 48/16 370/252 |
| 2013/0016672 A1* | 1/2013 | Yang | H04L 1/0046 370/329 |
| 2013/0163406 A1* | 6/2013 | Oizumi | H04L 1/0061 370/216 |
| 2013/0163543 A1* | 6/2013 | Freda | H04W 72/0406 370/329 |
| 2013/0195067 A1* | 8/2013 | Khoshnevis | H04L 5/0094 370/330 |
| 2013/0272258 A1* | 10/2013 | Lee | H04B 7/0413 370/329 |
| 2014/0036803 A1* | 2/2014 | Park | H04W 72/042 370/329 |
| 2014/0078978 A1* | 3/2014 | Cheng | H04L 5/0053 370/329 |
| 2014/0161082 A1* | 6/2014 | Gao | H04W 72/1263 370/329 |
| 2014/0219196 A1* | 8/2014 | Patel | H04L 5/0091 370/329 |
| 2015/0063234 A1* | 3/2015 | Park | H04B 7/024 370/329 |
| 2015/0092690 A1* | 4/2015 | Seo | H04W 72/042 370/329 |
| 2015/0092695 A1* | 4/2015 | Zhao | H04W 24/00 370/329 |
| 2015/0117353 A1* | 4/2015 | Takeda | H04W 72/042 370/329 |
| 2015/0131579 A1* | 5/2015 | Li | H04L 1/08 370/329 |
| 2015/0181440 A1* | 6/2015 | Chen | H04W 16/18 370/329 |
| 2015/0181576 A1* | 6/2015 | Papasakellariou | H04L 5/0053 370/329 |
| 2016/0095111 A1* | 3/2016 | Wong | H04W 72/0446 370/336 |
| 2016/0183231 A1 | 6/2016 | Shi et al. | |
| 2016/0218788 A1* | 7/2016 | Yum | H04B 7/0626 |
| 2016/0302174 A1* | 10/2016 | Chatterjee | H04B 7/0486 |

OTHER PUBLICATIONS

ZTE, "Discussion on (E) PDCCH Coverage Improvement," 3GPP TSG RAN WG1 Meeting #76 R1-140277, Feb. 14, 2014.
Fujitsu, "(e)PDCCH Support for Coverage Deficit MTC Devices," 3GPP TSG RAN WG1 Meeting #75 R1-135132, Nov. 15, 2013.

\* cited by examiner

TRANSMISSION METHOD AND CONFIGURATION METHOD FOR DOWNLINK CONTROL CHANNEL, AND TERMINAL AND BASE STATION

CROSS REFERENCE TO RELATED APPLICATIONS

This application is the U.S. National Phase Application under 35 U.S.C. § 371 of International Application No. PCT/CN2016/076516, filed Mar. 16, 2016, designating the U.S. and published as WO 2016/184239 A1 on Nov. 24, 2016 which claims the benefit of Chinese Patent Application No. 201510251201.3, filed May 15, 2015, both of which are hereby incorporated by reference in their entirety.

TECHNICAL FIELD

The present disclosure relates to a downlink control channel technology in the field of wireless communication, and particularly relates to a transmission method and a configuration method for a downlink control channel in a wireless communication system, a terminal, a base station and a computer storage medium.

BACKGROUND

A user equipment (UE, also called as user terminal or terminal) of machine type communication (MTC) is also called as machine to machine (M2M) user communication equipment, which is a main application form in current Internet of things. In recent years, since long-term evolution (LTE)/long-term evolution advance (LTE-advance or LTE-A) has high spectral efficiency, more and more mobile operators select LTE/LTE-A as an evolution direction of a broadband wireless communication system. Various MTC data services based on LTE/LTE-A will be more attractive.

In an existing LTE/LTE-A system, transmission is performed by dynamic scheduling based on each subframe, i.e. each subframe can transmit different control channels.

A physical downlink control channel (PDCCH) and an enhanced physical downlink control channel (EPDCCH) are defined in LTE/LTE-A. Information carried in a physical control format indicator channel (PCFICH) is used for indicating the number of orthogonal frequency division multiplexing (OFDM) symbols of the PDCCH transmitted in one subframe. A physical hybrid-automatic repeat-request (ARQ) indicator channel (PHICH) is used for bearing acknowledge/negative acknowledge (ACK/NACK) feedback information of uplink transmission data. The downlink control channel adopts blind detection, and a terminal tries to demodulate the downlink control channel by virtue of different aggregation levels and candidates in a certain search space.

An existing UE-specific search space is shown in Table 1 and Table 2. The search space is composed of candidates corresponding to different aggregation levels. The terminal needs to demodulate each of the candidates until demodulation is accurate while demodulating the control channel, otherwise it should be believed that a control channel belonging to the UE is not received.

TABLE 1

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
|  | 2 | 12 | 6 |
|  | 4 | 8 | 2 |
|  | 8 | 16 | 2 |

The search space of the EPDCCH (One Distributed EPDCCH-PRB-set—Case 3) is shown in Table 2:

TABLE 2

| $N_{RB}^{X_p}$ | Number of EPDCCH candidates $M_p^{(L)}$ for Case 3 | | | | |
|---|---|---|---|---|---|
|  | L = 1 | L = 2 | L = 4 | L = 8 | L = 16 |
| 2 | 8 | 4 | 2 | 1 | 0 |
| 4 | 4 | 5 | 4 | 2 | 1 |
| 8 | 4 | 4 | 4 | 2 | 2 |

The PDCCH/EPDCCH is used for bearing downlink control information (DCI) including uplink and downlink scheduling information and uplink power control information.

Generally, a MTC terminal can obtain the DCI by demodulating the PDCCH/EPDCCH in each subframe, thereby realizing demodulation of a physical downlink share channel (PDSCH) and obtaining scheduling indication information of a physical uplink share channel (PUSCH).

Among MTC application terminals, one type of terminals cannot receive signals or channels transmitted in full bandwidth and coverage performance thereof is obviously decreased due to limited radio frequency reception bandwidths and limited locations or self-characteristics. For example, most of intelligent meter-reading MTC terminals are fixedly installed in a basement or other low-coverage-performance environments, mainly transmit packet data, have a low requirement on data rate and can tolerate a great data transmission delay. Since such type of terminals has low requirement on the data rate, with respect to a data channel, accurate transmission of the packet data may be ensured in manners such as a low modulation coding rate, repeated transmission in time-domain and the like.

With respect to a problem of receiving and detecting a control channel by a coverage-enhanced MTC terminal in case of transmission at different repeat times in the existing art, no effective solution exists at present.

SUMMARY

The present disclosure provides a transmission method and a configuration method for a downlink control channel, a terminal, a base station and a computer storage medium, thereby realizing accurate transmission of the downlink control channel on a base station side and detection and reception of the downlink control channel on a terminal side.

An embodiment of the present disclosure is realized as follows.

In a first aspect, embodiments of the present disclosure provide a transmission method for a downlink control channel. The method includes:

performing, by a terminal, a blind detection on the downlink control channel according to a maximum number (N_total) of candidates in a repeated transmission, where the N_total meets one of the following conditions:

the N_total is not greater than a total number N_legacy of candidates of a single subframe of a transmission terminal (legacy UE) of a long-term evolution (LTE) system;

the N_total is N_legacy×Y which is a product of the N_legacy and a maximum value Y of types of repeat times for performing the blind detection on the downlink control channel; and the N_total ranges from the N_legacy to the N_legacy×Y.

In a second aspect, embodiments of the present disclosure provide a configuration method for a downlink control channel. The method includes:

configuring, by a base station, a set (A, B) of detection parameters of the downlink control channel through high-level signaling, where "A" is configured to represent aggregation levels or a total number of physical resource block (PRB) sets, and "B" is configured to represent repeat times, repeat levels or coverage levels;

where "A" is configured, so that a same number of aggregation levels are configured for each coverage condition, and it is supported that partial aggregation levels are different; or "A" is configured so that corresponding aggregation levels are implicitly obtained by the number of the PRBs; and "B" is configured to be an absolute value or a relative value, where the absolute value refers to a determined repeat times, and the relative value is obtained by multiplying reference repeat times corresponding to the coverage levels and the repeat levels by an adjustment quantity, or by adding a step length to the reference repeat times or subtracting the step length from the reference repeat times.

In a third aspect, embodiments of the present disclosure provide a terminal. The terminal includes:

a first determination unit, configured to determine a maximum number (N_total) of candidates of a downlink control channel in a repeated transmission; and a detection unit, configured to perform a blind detection on the downlink control channel according to the N_total of the candidates in the repeated transmission, where the N_total meets one of the following conditions:
the N_total is not greater than a maximum blind detection number (N_legacy) of a single subframe of a transmission terminal (legacy UE) of a long-term evolution (LTE) system;
the N_total is N_legacy×Y which is a product of the N_legacy and a maximum value Y of types of repeat times for performing the blind detection on the downlink control channel; and
the N_total ranges from the N_legacy to the N_legacy×Y.

In a fourth aspect, embodiments of the present disclosure provide a base station. The base station includes:

a second determination unit, configured to determine a set (A, B) of detection parameters of a downlink control channel; and a configuration unit, configured to configure the set (A, B) of detection parameters of a downlink control channel through high-level signaling, where "A" is configured to represent aggregation levels or a total number of physical resource block (PRB) sets, and "B" is configured to represent repeat times, repeat levels or coverage levels;

where "A" is configured, so that a same number of aggregation levels are configured for each coverage condition, and it is supported that partial aggregation levels are different; or "A" is configured so that corresponding aggregation levels are implicitly obtained by the number of the PRBs; and "B" is configured to be an absolute value or a relative value, where the absolute value refers to a determined repeat times, and the relative value is obtained by multiplying reference repeat times corresponding to the coverage levels and the repeat levels by an adjustment quantity, or by adding a step length to the reference repeat times or subtracting the step length from the reference repeat times.

In a fifth aspect, embodiments of the present disclosure provide a computer storage medium storing executable instructions. The executable instructions are used for executing the transmission method for the downlink control channel and the configuration method for the downlink control channel provided in embodiments of the present disclosure.

In embodiments of the present disclosure, a reception problem of the aggregation levels and the repeat times of blind detection during repeated transmission of the MTC terminal with the limited reception bandwidth can be ensured, thereby ensuring normal and effective communication of the MTC terminal. According to the configuration method for the downlink control channel and the base station provided by embodiments of the present disclosure, the set of detection parameters of the downlink control channel is configured through the high-level signaling, thereby ensuring accurate transmission of the downlink control channel by the base station, and solving transmission and detection problems of the physical downlink control channel using multiple aggregation levels and multiple repeat times/levels in a bandwidth-limited scenario and a coverage-enhanced scenario.

DETAILED DESCRIPTION

In order to make the present disclosure more clear, the present disclosure will be preferably described below in detail in combination with drawings and specific embodiments. It should be noted that embodiments in the present application and various manners in embodiments can be combined mutually without conflict.

The maximum number of blind detection may be exponentially increased along with the number of repeat subframes while receiving control information of repeated transmission, so it is necessary to limit blind detection paths. Meanwhile, the PDCCH is unavailable due to a limited bandwidth. A common method for limiting blind detection paths is as follows: the same aggregation level and the same candidate are used by each subframe. The number of repeated transmission is not always a constant value. For example, coverage performance is changed due to change of conditions of channels or positions of terminals, and thus the number of repeated transmission is further changed. Therefore, besides detecting different aggregation levels, the terminal should also detect the repeat times while receiving detection control information. Therefore, a blind detection solution design of the control channel during repeated transmission needs to be comprehensively considered.

Figure 1:
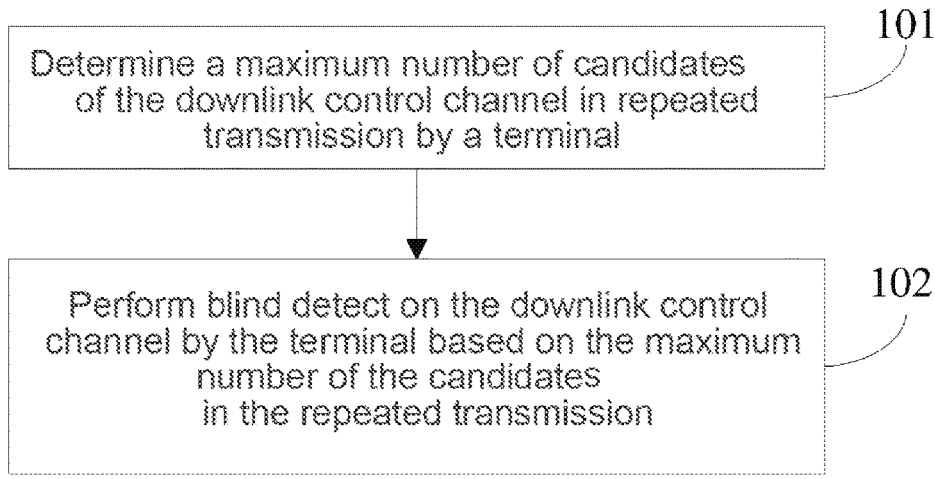
FIG. 1 is a schematic diagram illustrating a realization process of a transmission method for a downlink control channel in embodiments of the present disclosure.

As shown in FIG. 1, a transmission method for a downlink control channel recited in embodiments of the present disclosure includes the following steps.

In step 101, a terminal determines the maximum number of candidates of the downlink control channel in a repeated transmission.

In step 102, the terminal performs a blind detection on the downlink control channel based on the maximum number of the candidates in the repeated transmission.

The maximum number N_total of the candidates of the downlink control channel in the repeated transmission for the terminal is not greater than a maximum blind detection number N_legacy of single-subframe of a transmission terminal legacy UE of a LTE system, or, the maximum number N_total of the candidates is a product of N_legacy and types Y of repeat times required to be detected, that is, N_total=N_legacy×Y; or, the maximum number N_total of the candidates meets: N_legacy≤N_total≤N_legacy×Y. The maximum blind detection number is a maximum number of blind detections performed with respect to a UE-specific Search Space (USS) only, or a maximum number of blind detections performed with respect to a common search space (CSS) of a UE, or a maximum number of blind detection performed with respect to the USS and the CSS.

There are at most X types of aggregation levels used for performing a blind detection (also called detection in embodiments of the present disclosure) on the downlink control channel, where X is an integer greater than or equal to 1, preferably 1, 2 and 4.

There are at most Y types of blind detections of the repeat times of the downlink control channel, where Y is an integer greater than or equal to 1, preferably 1, 2 and 4.

X×Y≤Z, Z is equal to (N_total)/2 or N_total. The maximum value of a sum of numbers of candidates corresponding to each of the aggregation levels of the downlink control channel is Z/Y. The maximum value of a sum of numbers of candidates corresponding to each of the repeat times of the downlink control channel is Z/X.

The repeat times and the aggregation levels of the downlink control channel may be determined by the terminal through at least one of the followings manners: being determined through pre-definition by the terminal; being determined, by the terminal, through configuring with a system information block (SIB); being determined, by the terminal, through configuring with a random access response (RAR); and being determined, by the terminal, through configuring with a radio resource control (RRC) signaling.

For example, as for the specific search space, a value of Z is 16 when two types of downlink control information formats are detected, and the value of Z is 32 when one type of downlink control information format is detected. As for the common search space, the value of Z is 6 when two types of downlink control information formats are detected, and the value of Z is 12 when one type downlink control information format is detected.

A constant set of detection parameters is used when the repeat times and the aggregation levels of the downlink control channel are determined in the pre-definition manner. When the pre-definition manner is used for common information, that is, the CSS is pre-defined, a specific possible set (A, B) combination is one of the followings:

1). {Multiple Aggregation Levels, a Single Repeat Times}
Possible examples are as follows: {(AL4\8), (one times)} when the coverage level is 1; {(AL8\16), (2 times)} when the coverage level is 2; and {(AL16\24), (3 times)} when the coverage level is 3. Since only one type of repeat times exists, in consideration of specificity of a 6PRB set, the number of the candidates corresponding to each of the aggregation levels may be consistent with the number of candidates in the existing search space, or less than the number of the candidates in the existing search space.

2). {Multiple Aggregation Levels, Single Repeat Level/ Coverage Level}
In this case, if one repeat level/coverage level only corresponds to one repeat times, it is the same as the above 1); and if the repeat levels correspond to multiple repeat times, a corresponding table may be defined in a protocol, and then the number of the candidates for each aggregation level needs to be correspondingly decreased.

3). {Multiple Aggregation Levels, Multiple Repeat Times}
Possible examples are as follows: {(AL4\8), (1, 2, 4, 8)} when the coverage level is 1; {(AL8\16), (10, 20, 40, 80)} when the coverage level is 2; and {(AL16\24), (80, 100, 160, 200)} when the coverage level is 3. In this case, considering that the complexity of the blind detection should not be higher than the legacy UE, the candidates corresponding to each of the aggregation levels are correspondingly decreased under a condition that multiple repeat times need to be subjected to blind detection. For example, a sum of the candidates corresponding to each of the aggregation levels will be correspondingly decreased by 4 times when 4 repeat times need to be detected.

4). {One Aggregation Level, Multiple Repeat Times}
Possible examples are as follows: {(AL8), (1, 2, 4, 8)} when the coverage level is 1; {(AL16), (10, 20, 40, 80)} when the coverage level is 2; and {(AL24), (80, 100, 160, 200)} when the coverage level is 3.

Unicast information is configured in the pre-defined manner, that is, the USS is pre-defined. A difference is as follows: a set of the repeat times and a set of the aggregation level sets used by the CSS are generally subsets of the set of repeat times and the set of the aggregation level used by the USS. A constant detection parameter set is used. A specific possible set (A, B) combination is one of the followings:

1). {Multiple Aggregation Levels, a Single Repeat Times}
Possible examples are as follows: {(AL1\2\4\8), (1 times)} when the coverage level is 1; {(AL2\4\8\16), (2 times)} when the coverage level is 2; and {(AL4\8\16\24), (3 times)} when the coverage level is 3. In this case, since only one type of repeat times exists, the number of the candidates corresponding to each of the aggregation levels may be equivalent to the number of candidates in the existing search space, or is slightly decreased, if specificity of a 6PRB set is considered.

2). {Multiple Aggregation Levels, Single Repeat Level/ Coverage Level}
In this case, if one repeat level/coverage level only corresponds to one repeat times, it is the same as 1; and if the repeat levels correspond to multiple repeat times, a corresponding table may be defined in a protocol, and then the number of the candidates of each aggregation level needs to be correspondingly decreased.

3). {Multiple Aggregation Levels, Multiple Repeat Times}
Possible examples are as follows: {(AL1\2\4\8), (1, 2, 4, 8)} when the coverage level is 1; {(AL2\4\8\16), (10, 20, 40, 80)} when the coverage level is 2; and {(AL4\8\16\24), (80, 100, 160, 200)} when the coverage level is 3. Then, considering that the complexity of the blind detection should not be higher than the legacy UE, the candidates corresponding to each of the aggregation levels need to be correspondingly decreased under a condition that multiple repeat times need to be subjected to blind detection. The sum of the candidates corresponding to each of the aggregation levels will be correspondingly decreased by 4 times when 4 types of repeat times need to be detected. In consideration of differences between different coverage levels, the number of the configured aggregation levels or repeat levels may be decreased on the aggregation levels 2 and 3, that is, flexibility is reduced when the aggregation level is higher, and the flexibility is maintained when the aggregation level is lower.

4). {One Aggregation Level, Multiple Repeat Times}

Possible examples are as follows: {(AL4), (1, 2, 4, 8)} when the coverage level is 1; {(AL8), (10, 20, 40, 80)} when the coverage level is 2; and {(AL24), (80, 100, 160, 200)} when the coverage level is 3.

Preferably, a principle of allocating numbers of the candidates to X types of aggregation levels by the base station includes at least one of the followings.

When X is greater than 1, the number of the candidates of higher aggregation level may preferably completely occupy the located physical resource block set (PRB set). In this case, the number of candidates of the highest aggregation level that can be supported is configured and completely occupies the configured PRB set firstly; secondly, the number of the candidates of the second highest aggregation level that can be supported is configured and completely occupies the configured PRB set until the maximum value of the sum of the number of the candidates is reached.

The X types of aggregation levels detected correspond to at least one candidate. Since Y types of aggregation levels are allocated, each of the aggregation levels should correspond to at least one candidate.

Alternatively, when X is greater than 1, the number of the candidates allocated to the lower aggregation level is not less than the number of the candidates allocated to the higher aggregation level. In this case, the following manner may be adopted: firstly, the number of candidates of the lowest aggregation level that can be supported is configured and completely occupies the configured PRB set; secondly, the number of the candidates of the second lowest aggregation level that can be supported is configured and completely occupies the configured PRB set until the maximum value of the sum of the number of the candidates is reached.

Preferably, when X is equal to 1 and the aggregation level adopts the highest aggregation level (AL=24) enhanced control channel element (ECCE), a manner of configuring mapping through pre-definition or high-level signaling includes one of the followings while completely occupying the 6PRB set: performing ECCE mapping in the 6PRB set by utilizing 2 sub-sets respectively; performing ECCE mapping in the 6PRB set by utilizing 3 sub-sets respectively; performing ECCE mapping in the 6PRB set directly; and performing ECCE mapping by utilizing 6PRB of a 8PRB set. The high-level signaling indicates one of the above four situations with 2 bits, or indicates any two situations in the above four situations with 1 bit.

The ECCE mapping is preferably performed in a sub-set having a PRB with the minimum serial number based on an ascending order of serial numbers of the PRBs in the following situations: the ECCE mapping is performed in the 6PRB set by utilizing 2 sub-sets respectively, and the 2 sub-sets are 2PRB and 4PRB respectively; the ECCE mapping is performed in the 6PRB set by utilizing 3 sub-sets respectively, and the 3 sub-sets are 2PRB, 2PRB and 2PRB respectively.

For example, in the case that the ECCE mapping is performed in the 6PRB set by utilizing 2 sub-sets respectively and the 2 sub-sets are 2PRB and 4PRB respectively, if the PRB with the minimum serial number is in the 2PRB, 0-7ECCE is numbered in the 2PRB, and then 8-23ECCE is numbered in the 4PRB; if the PRB with the minimum serial number is in the 4PRB, 0-15ECCE is numbered in the 4PRB, and then 16-23ECCE is numbered in the 2PRB; and a number of the 2PRB in a frequency domain is lower than a number of the 4PRB in the frequency domain in the 2 sub-sets (i.e., the 2PRB and 4PRB) included in the 6PRB set.

In the case that each of the 3 sub-sets is 2PRB, i.e., totally three 2PRB, the 0-7ECCE, the 8-15ECCE and the 16-23ECCE are sequentially numbered in the three 2PRB based on the ascending order of the serial numbers of the PRBs.

For example, in one set, AL=24. When a rule of distributed mapping is not modified, 8ECCE and 16ECCE may be completely occupied respectively according to an area of the 2PRB and an area of the 4PRB. In this way, 24ECCE is completely occupied. That is to say, there is still only one set, while a process of numbering ECCE is equivalent to grouping, i.e., 0-7ECCE (LeCCE or DeCCE) is numbered in the 2PRB, and then 8-23ECCE (LeCCE or DeCCE) is numbered in the 4PRB. Advantages of such a manner are as follows: a DeCCE mapping formula does not need to be modified; the search space is still 24ECCE (6PRB); and after being allocated in such a manner, it may be multiplexed with a PRB set of legacy EPDCCH.

The search space L is constant and is still:

$$L\left\{\left(Y_{p,k} + \left\lfloor \frac{m \cdot N_{ECCE,p,k}}{L \cdot M_p^{(L)}} \right\rfloor + b \right) \bmod \lfloor N_{ECCE,p,k}/L \rfloor \right\} + i.$$

There exists only one set corresponding to the ECCE mapping, and the set is $X_m$. In this case, in the above formula, m=0, and the set contains 6PRB, that is, $N_{RB}^{X_m}=6$.

Two groups (i.e., $X_m^{group1}$ and $X_m^{group2}$) are introduced into the set respectively, and numbers of RBs in each group is 2 and 4, that is, $N_{RB}^{X_m^{group1}}=2$, $N_{RB}^{X_m^{group2}}=4$.

In the ECCE mapping, centralized mapping is not influenced, and the ECCE mapping in the group 1 and the group 2 is respectively described regarding the distributed mapping.

As for Group 1, in a subframe X EPDCCH set $X_m$ can be used for ECCEs of EPDCCH transmission numbered from 0 to $N_{ECCE,m,i}^{group1}-1$, and the number n of the ECCE corresponds to the followings:

1) an EREGs number $(n \bmod N_{ECCE}^{RB}) + jN_{ECCE}^{RB}$ in PRB index $\lfloor n/N_{ECCE}^{RB} \rfloor$ during the centralized mapping; and 2) an EREGs number $$\left\lfloor n / N_{RB}^{X_m^{group1}} \right\rfloor + jN_{ECCE}^{RB}$$

in PRB indices $(n+j\max(1, N_{RB}^{X_m^{group1}}/N_{EREG}^{ECCE})) \bmod N_{RB}^{X_m^{group1}}$ during the distributed mapping.

As for Group 2, in the subframe i, EPDCCH set $X_m$ can be used for the ECCEs of the EPDCCH transmission numbered from $N_{ECCE,m,i}^{group1}$ to $N_{ECCE,m,i}-1$, and the number n of the ECCE corresponds to the followings:

1) an EREGs number $(n \bmod N_{ECCE}^{RB}) + jN_{ECCE}^{RB}$ in PRB index $\lfloor n/N_{ECCE}^{RB} \rfloor$ during the centralized mapping; and 2) an EREGs number $$\left\lfloor n / N_{RB}^{X_m^{group2}} \right\rfloor + jN_{ECCE}^{RB}$$

in PRB indices $(n+j\max(1, N_{RB}^{X_m^{group2}}/N_{EREG}^{ECCE})) \bmod N_{RB}^{X_m^{group2}}$ during the distributed mapping, where $N_{ECCE,m,i}=N_{ECCE,m,i}^{group1}+N_{ECCE,m,i}^{group2}$.

Preferably, a principle of allocating numbers of the candidates to Y types of repeat times by the base station includes at least one of the followings:

when Y is greater than 1, the candidates of the maximum repeat times is 1; and when Y is greater than 1, the number of the candidates of a first (smallest) repeat times is not less than the number of the candidates of a second largest repeat times, and the first repeat times is less than the second repeat times.

With respect to each of the repeat times in the Y types of repeat times detected, there exists at least one candidate.

Figure 2:
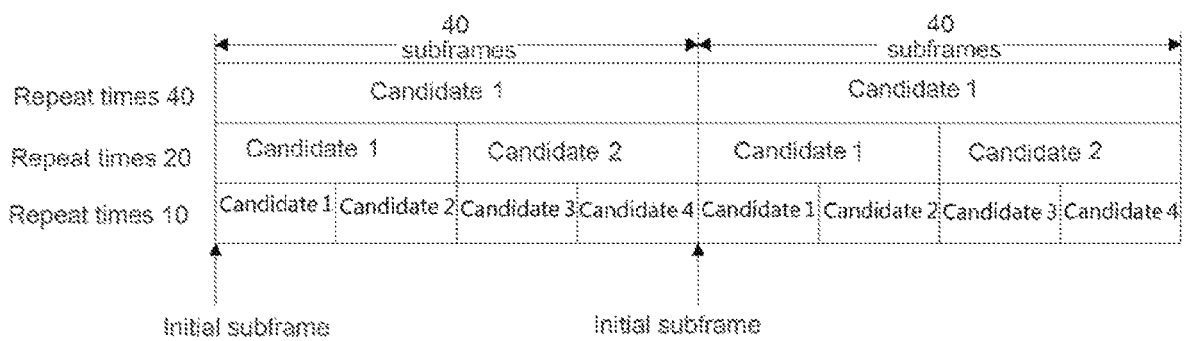
FIG. 2 is a schematic diagram 1 illustrating candidates corresponding to repeat times in embodiments of the present disclosure.

For example, as for the candidates for the repeat times, a relation among the various repeat times is preferably as follows: larger repeat times are multiples of smaller repeat times, then the number of the candidates for the maximum repeat times is 1, and the number of the candidates for the smaller repeat times is multiples of the number of the candidates for the larger repeat times. As shown in FIG. 2, there is one candidate when the repeat times is 40; there are two candidates when the repeat times is 20; and there are four candidates when the repeat times is 10. In this case, the number of the candidates corresponding to the X types of aggregation levels configured is the largest when not more than single-subframe blind detection, and is at most 2 or 4.

Figure 3:
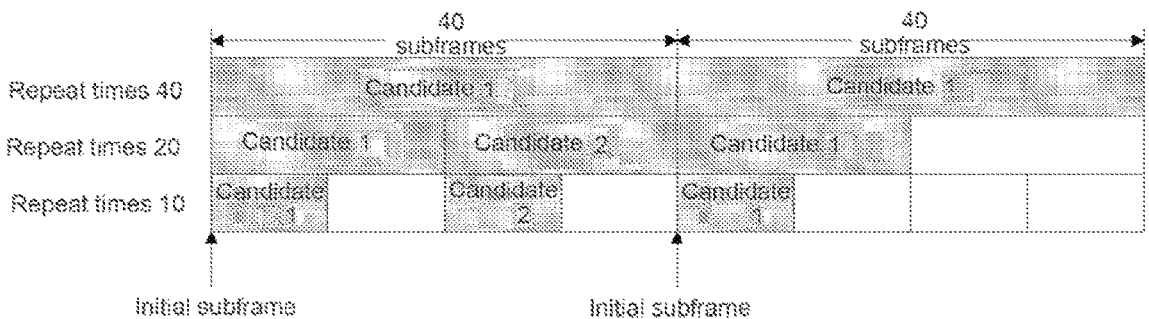
FIG. 3 is a schematic diagram 2 illustrating candidates corresponding to repeat times in embodiments of the present disclosure.

In addition, since the complexity of the blind detection is increased due to the repeat times of the blind detection, the number of the aggregation levels or the number of the candidates needs to be correspondingly decreased. Therefore, the number of the candidates for the repeat times also needs to be controlled. As shown in FIG. 3, there is at least one candidate for each of the Y types of repeat times detected. For example, there is one candidate when the repeat times is 40; there are two candidates when the repeat times is 20; and there are two candidates when the repeat times is 10. Alternatively, there is one candidate when the repeat times is 40; there is one candidate when the repeat times is 20, and there is one candidate when the repeat times is 10. In this case, the number of the candidates corresponding to the X types of aggregation levels configured is the largest when not more than single-subframe blind detection, and is at most 5 or 10.

Preferably, a set (A, B) of detection parameters of the downlink control channel is configured by the base station through the high-level signaling, where "A" represents the number of the aggregation levels or PRBs configured, and "B" represents the repeat times or repeat levels or coverage levels configured.

"A" may mean that the same number of aggregation levels are configured for each coverage condition, while partial aggregation levels are allowed to be different; or mean that corresponding aggregation levels are implicitly obtained by configuring the number of the PRBs. "B" may be configured as an absolute value or a relative value. The absolute value refers to a determined repeat times. The relative value is obtained by multiplying reference repeat times corresponding to the coverage levels or the repeat levels by an adjustment quantity, or by adding the reference repeat times to a step length or subtracting the step length from the reference repeat times.

For example, the configured set is the set (A, B), where "A" represents the aggregation levels configured, and "B" represents the repeat times configured. "B" may be configured as the absolute value or the relative value. The absolute value refers to the determined repeat times. The relative value is obtained by multiplying the reference repeat times corresponding to the coverage levels by the adjustment quantity, or by adding the reference repeat times to the step length or subtracting the step length from the reference repeat times.

The parameter instances configured are as follows:

the number of PRBs: 2, 4 and 6;

aggregation levels (AL): 1, 2, 4, 8, 16, 24ECCE;

repeat levels/coverage levels (RL): 1, 2 and 3 (corresponding to coverage increase 5, 10 and 15 dB or 6, 12 and 18 dB); herein, the RL1, 2 and 3 may correspond to specific times, such as 10 times, 20 times and 80 times; preferably, signaling indication may be added to or subtracted from the step length N based on the times, where N may be 2, 4, 8 and 10. Alternatively, the RL1, 2 and 3 only represent intermediate variables and do not correspond to specific times, and each of the RLs includes a set of specific times; for example, RL1 is {1, 2, 4, 8, 10, 12 and 16}, RL2 is {10, 12, 14, 16, 18, 20, 40, 60, 80 and 100}, and RL3 is 180, 100, 120, 140, 160, 180, 200, 250, 300};

repeat times: specific values, for example, 1, 2, 4, 8, 10, 12, 16, 20, 40, 80, 100, 120, 140, 160, 180, 200, 300, etc.

Description is made below with reference an example in which "B" is the absolute value of the repeat times. Various tables may be independently configured or configured in a combined manner as follows.

In example 1, the set (A, B) is configured to include four types of aggregation levels and four types of repeat times, in the configured repeat times, preferably M=K=L=1, or each of M, K and L is a non-zero integer or a fraction.

The four types of aggregation levels and four types of repeat times are shown in Table 1.

TABLE 1

| High-level signaling configuration | Aggregation levels | Repeat times |
|---|---|---|
| set(0) | 4 types | {1M, 2M, 4M, 8M} |
| set(1) | 4 types | {10K, 20K, 40K, 80K} |
| set(2) | 4 types | {100L, 150L, 200L, 300L} |

The aggregation levels and candidates corresponding to Table 1 are shown in Table 1-1 or 1-2.

TABLE 1-1

| | Number of M-PDCCH candidates $M_p^{(L)}$ | | | | |
|---|---|---|---|---|---|
| $N_{RB}^{X_p}$ | L = 2 | L = 4 | L = 8 | L = 16 | L = 24 |
| 2 | 1 | 2 | 1 | 0 | 0 |
| 4 | 1 | 1 | 1 | 1 | 0 |
| 6 | 0 | 1 | 1 | 1 | 1 |

TABLE 1-2

| | Number of M-PDCCH candidates $M_p^{(L)}$ | | | | | |
|---|---|---|---|---|---|---|
| $N_{RB}^{X_p}$ | L = 1 | L = 2 | L = 4 | L = 8 | L = 16 | L = 24 |
| 2 | 1 | 1 | 1 | 1 | 0 | 0 |
| 4 | 0 | 1 | 1 | 1 | 1 | 0 |
| 6 | 0 | 0 | 1 | 1 | 1 | 1 |

In example 2, the set (A, B) is configured to include four types of aggregation levels and two types of repeat times, in the configured repeat times, preferably M=K=L=1, or each of M, K and L is a non-zero integer or a fraction.

The four types of aggregation levels and two types of repeat times are shown in Table 2.

TABLE 2

| High-level signaling configuration | Aggregation levels | Repeat times |
|---|---|---|
| set(0) | 4 types | {1M, 5M} |
| set(1) | 4 types | {4K, 20K} |
| set(2) | 4 types | {16L, 80L} |

The aggregation levels and candidates corresponding to Table 2 are shown in Table 2-1 or 2-2.

When there are four types of aggregation level detections and two types of repeat times detections, a sum of the candidates for each of the aggregation levels is 8 (an upper limit). Therefore, allocation based on a principle of "preferably ensuring that candidates for larger aggregation levels can completely occupy the located PRB set" is shown in tables below.

TABLE 2-1

| | Number of M-PDCCH candidates $M_p^{(L)}$ | | | | |
|---|---|---|---|---|---|
| $N_{RB}^{Xp}$ | L = 2 | L = 4 | L = 8 | L = 16 | L = 24 |
| 2 | 4 | 2 | 1 | 0 | 0 |
| 4 | 1 | 4 | 2 | 1 | 0 |
| 6 | 0 | 3 | 3 | 1 | 1 |

TABLE 2-2

| | Number of M-PDCCH candidates $M_p^{(L)}$ | | | | | |
|---|---|---|---|---|---|---|
| $N_{RB}^{Xp}$ | L = 1 | L = 2 | L = 4 | L = 8 | L = 16 | L = 24 |
| 2 | 1 | 4 | 2 | 1 | 0 | 0 |
| 4 | 0 | 1 | 4 | 2 | 1 | 0 |
| 6 | 0 | 0 | 3 | 3 | 1 | 1 |

In example 3, the set (A, B) is configured to include four types of aggregation levels and one type of repeat times, in the configured repeat times, preferably M=K=L=1, or each of M, K and L is a non-zero integer or a fraction.

The four types of aggregation levels and the single repeat times are shown in Table 3.

TABLE 3

| High-level signaling configuration | Aggregation levels | Repeat times |
|---|---|---|
| set(0) | 4 | 1M |
| set(1) | 4 | 10K |
| set(2) | 4 | 100L |

The aggregation levels and candidates corresponding to Table 3 are shown in Table 3-1 or 3-2.

When there are four types of aggregation level detections and one type of repeat times detection, a sum of the candidates for each of the aggregation levels is 16 (an upper limit). Therefore, allocation based on a principle of "preferably ensuring that candidates for the larger aggregation levels can completely occupy the located PRB set" is shown in tables below:

TABLE 3-1

| | Number of M-PDCCH candidates $M_p^{(L)}$ | | | | |
|---|---|---|---|---|---|
| $N_{RB}^{Xp}$ | L = 2 | L = 4 | L = 8 | L = 16 | L = 24 |
| 2 | 4 | 2 | 1 | 0 | 0 |
| 4 | 8 | 4 | 2 | 1 | 0 |
| 6 | 0 | 6 | 3 | 1 | 1 |

TABLE 3-2

| | Number of M-PDCCH candidates $M_p^{(L)}$ | | | | | |
|---|---|---|---|---|---|---|
| $N_{RB}^{Xp}$ | L = 1 | L = 2 | L = 4 | L = 8 | L = 16 | L = 24 |
| 2 | 8 | 4 | 2 | 1 | 0 | 0 |
| 4 | 0 | 8 | 4 | 2 | 1 | 0 |
| 6 | 0 | 0 | 6 | 3 | 1 | 1 |

In example 4, the set (A, B) is configured to include two types of aggregation levels and four types of repeat times, in the configured repeat times, preferably M=K=L=1, or each of M, K and L is a non-zero integer or a fraction.

The two type of aggregation levels and the four types of repeat times are shown in Table 4.

TABLE 4

| High-level signaling configuration | Aggregation levels | Repeat times |
|---|---|---|
| set(0) | 2 configurations in Table 4-2 | {1M, 2M, 4M, 8M} |
| set(1) | 2 configurations in Table 4-1 | {4K, 8K, 16K, 32K} |
| set(2) | 2 configurations in Table 4-1 | {16L, 32L, 64L, 128L} |

The aggregation levels and candidates corresponding to Table 4 are shown in Table 4-1 or 4-2.

When there are two types of aggregation levels detections and four types of repeat times detections, a sum of the candidates for each of the aggregation levels is 4 (an upper limit). Therefore, allocation based on a principle of "preferably ensuring that the candidates for the larger aggregation levels may completely occupy the located PRB set" is shown in Table 4-1 below.

TABLE 4-1

| | Number of M-PDCCH candidates $M_p^{(L)}$ | | | | |
|---|---|---|---|---|---|
| $N_{RB}^{Xp}$ | L = 2 | L = 4 | L = 8 | L = 16 | L = 24 |
| 2 | 0 | 2 | 1 | 0 | 0 |
| 4 | 0 | 0 | 2 | 1 | 0 |
| 6 | 0 | 0 | 0 | 1 | 1 |

The largest bearable aggregation levels are not used under a small coverage condition, as shown in Table 4-2.

TABLE 4-2

| | Number of M-PDCCH candidates $M_p^{(L)}$ | | | | | |
|---|---|---|---|---|---|---|
| $N_{RB}^{Xp}$ | L = 1 | L = 2 | L = 4 | L = 8 | L = 16 | L = 24 |
| 2 | 0 | 2 | 2 | 0 | 0 | 0 |
| 4 | 0 | 0 | 2 | 2 | 0 | 0 |
| 6 | 0 | 0 | 0 | 3 | 1 | 0 |

In example 5, the set (A, B) is configured to include two types of aggregation levels and two types of repeat times, in the configured repeat times, preferably M=K=L=1, or each of M, K and L is a non-zero integer or a fraction.

The two types of aggregation levels and the two types of repeat times are shown in Table 5.

TABLE 5

| High-level signaling configuration | Aggregation levels | Repeat times |
|---|---|---|
| set(0) | 2 configurations in Table 5-2 | {1M, 5M} |
| set(1) | 2 configurations in Table 5-1 | {10K, 20K} |
| set(2) | 2 configurations in Table 5-1 | {100L, 200L} |

The aggregation levels and candidates corresponding to Table 5 are shown in Table 5-1 or 5-2.

When there are two types of aggregation level detections and two types of repeat times detections, a sum of the candidates for each of the aggregation levels is 8 (an upper limit). Therefore, allocation based on a principle of "preferably ensuring that the candidates for the larger aggregation levels may completely occupy the located PRB set" is shown in Table 5-1 below.

TABLE 5-1

| | Number of M-PDCCH candidates $M_p^{(L)}$ | | | | |
|---|---|---|---|---|---|
| $N_{RB}^{Xp}$ | L = 2 | L = 4 | L = 8 | L = 16 | L = 24 |
| 2 | 0 | 2 | 1 | 0 | 0 |
| 4 | 0 | 0 | 2 | 1 | 0 |
| 6 | 0 | 0 | 0 | 1 | 1 |

Alternatively, as shown in Table 5-2, the largest bearable aggregation levels are not used under the small coverage condition.

TABLE 5-2

| | Number of M-PDCCH candidates $M_p^{(L)}$ | | | | | |
|---|---|---|---|---|---|---|
| $N_{RB}^{Xp}$ | L = 1 | L = 2 | L = 4 | L = 8 | L = 16 | L = 24 |
| 2 | 0 | 4 | 2 | 0 | 0 | 0 |
| 4 | 0 | 0 | 4 | 2 | 0 | 0 |
| 6 | 0 | 0 | 0 | 3 | 1 | 0 |

In example 6, the set (A, B) is configured to include two types of aggregation levels and one type of repeat times, in the configured repeat times, preferably M=K=L=1, or each of M, K and L is a non-zero integer or a fraction.

The two types of aggregation levels and one type of repeat times are shown in Table 6.

TABLE 6

| High-level signaling configuration | Aggregation levels | Repeat times |
|---|---|---|
| set(0) | 2 configurations in Table 6-2 | 1M |
| set(1) | 2 configurations in Table 6-1 | 8K |
| set(2) | 2 configurations in Table 6-1 | 64L |

The aggregation levels and candidates corresponding to Table 6 are shown in Table 6-1 or 6-2.

When there are two types of aggregation level detections and one type of repeat times detection, a sum of the candidates for each of the aggregation levels is 16 (an upper limit). Therefore, allocation based on a principle of "preferably ensuring that the candidates for the larger aggregation levels may completely occupy the located PRB set" is shown in Table 6-1 below.

TABLE 6-1

| | Number of M-PDCCH candidates $M_p^{(L)}$ | | | | |
|---|---|---|---|---|---|
| $N_{RB}^{Xp}$ | L = 2 | L = 4 | L = 8 | L = 16 | L = 24 |
| 2 | 0 | 2 | 1 | 0 | 0 |
| 4 | 0 | 0 | 2 | 1 | 0 |
| 6 | 0 | 0 | 0 | 1 | 1 |

Alternatively, as shown in Table 6-2, the largest bearable aggregation levels are not used under the small coverage condition.

TABLE 6-2

| | Number of M-PDCCH candidates $M_p^{(L)}$ | | | | | |
|---|---|---|---|---|---|---|
| $N_{RB}^{Xp}$ | L = 1 | L = 2 | L = 4 | L = 8 | L = 16 | L = 24 |
| 2 | 0 | 4 | 2 | 0 | 0 | 0 |
| 4 | 0 | 0 | 4 | 2 | 1 | 0 |
| 6 | 0 | 0 | 0 | 3 | 1 | 0 |

In example 7, the set (A, B) is configured to include one type of aggregation level and four types of repeat times, in the configured repeat times, preferably M=K=L=1, or each of M, K and L is a non-zero integer or a fraction.

The one type of aggregation level and the four types of repeat times are shown in Table 7.

TABLE 7

| High-level signaling configuration | Aggregation levels | Repeat times |
|---|---|---|
| set(0) | 1 configuration in Table 7-3 | {1M, 2M, 4M, 8M} |
| set(1) | 1 configuration in Table 7-2 | {10K, 20K, 40K, 80K} |
| set(2) | 1 configuration in Table 7-1 | {100L, 150L, 200L, 300L} |

The aggregation levels and candidates corresponding to Table 7 are shown in any one of Table 7-1, Table 7-2 and Table 7-3.

When there are four types of repeat times detections and one type of aggregation level detection, a sum of the candidates for each of the aggregation levels is 4 (an upper limit). Therefore, allocation based on a principle of "preferably ensuring that the candidates for the larger aggregation levels may completely occupy the located PRB set" is shown in tables below.

TABLE 7-1

| | Number of M-PDCCH candidates $M_p^{(L)}$ | | | | |
|---|---|---|---|---|---|
| $N_{RB}^{Xp}$ | L = 2 | L = 4 | L = 8 | L = 16 | L = 24 |
| 2 | 0 | 0 | 1 | 0 | 0 |
| 4 | 0 | 0 | 0 | 1 | 0 |
| 6 | 0 | 0 | 0 | 0 | 1 |

Table 7-1

As shown in Table 7-2, the larger bearable aggregation levels are used under the small coverage condition.

TABLE 7-2

| $N_{RB}^{X_p}$ | Number of M-PDCCH candidates $M_p^{(L)}$ | | | | | |
|---|---|---|---|---|---|---|
| | L = 1 | L = 2 | L = 4 | L = 8 | L = 16 | L = 24 |
| 2 | 0 | 0 | 2 | 0 | 0 | 0 |
| 4 | 0 | 0 | 0 | 2 | 0 | 0 |
| 6 | 0 | 0 | 0 | 0 | 1 | 0 |

Alternatively, the smaller bearable aggregation levels are used under the small coverage condition as shown in Table 7-3.

TABLE 7-3

| $N_{RB}^{X_p}$ | Number of M-PDCCH candidates $M_p^{(L)}$ | | | | | |
|---|---|---|---|---|---|---|
| | L = 1 | L = 2 | L = 4 | L = 8 | L = 16 | L = 24 |
| 2 | 0 | 4 | 0 | 0 | 0 | 0 |
| 4 | 0 | 0 | 4 | 0 | 0 | 0 |
| 6 | 0 | 0 | 0 | 3 | 0 | 0 |

In example 8, the set (A, B) is configured to include one types of aggregation level and two types of repeat times, in the configured repeat times, preferably M=K=L=1, or each of M, K and L is a non-zero integer or a fraction.

The one type of aggregation level and the two types of repeat times are shown in Table 8.

TABLE 8

| High-level signaling configuration | Aggregation levels | Repeat times |
|---|---|---|
| set(0) | 1 configuration in Table 7-3 | {1M, 5M} |
| set(1) | 1 configuration in Table 7-2 | {10K, 20K} |
| set(2) | 1 configuration in Table 7-1 | {100L, 200L} |

The aggregation levels and candidates corresponding to Table 8 are shown in any one of Table 7-1, table 7-2 and table 7-3.

In example 9, the set (A, B) is configured to include one type of aggregation level and one type of repeat times, in the configured repeat times, preferably M=K=L=1, or each of M, K and L is a non-zero integer or a fraction.

The one type of aggregation level and the one type of repeat times are shown in Table 9.

TABLE 9

| High-level signaling configuration | Aggregation levels | Repeat times |
|---|---|---|
| set (0) | 1 configuration in Table 7-3 | 1M |
| set (1) | 1 configuration in Table 7-2 | 10K |
| set (2) | 1 configuration in Table 7-1 | 100L |

The aggregation levels and candidates corresponding to Table 9 are shown in any one of Table 7-1, table 7-2 and table 7-3.

The above examples 1-9 may be independently configured or configured in a combined manner, as shown in an example 10.

In the example 10, the set (A, B) is configured to include two types of aggregation levels and one, two and four types of repeat times, in the configured repeat times, preferably M=K=L=1, or each of M, K and L is a non-zero integer or a fraction.

The two types of aggregation levels and the one, two and four types of repeat times are shown in Table 10.

TABLE 10

| High-level signaling configuration | Aggregation levels | Repeat times |
|---|---|---|
| set (0) | 2 configurations in Table 4-2 | {1M, 2M, 4M, 8M} |
| set (1) | 2 configurations in Table 4-1 | {10K, 20K, 40K, 80K} |
| set (2) | 2 configurations in Table 4-1 | {100L, 150L, 200L, 300L} |
| set (3) | 2 configurations in Table 5-2 | {1M, 5M} |
| set (4) | 2 configurations in Table 5-1 | {10K, 20K} |
| set (5) | 2 configurations in Table 5-1 | {100L, 200L} |
| set (6) | 2 configurations in Table 6-1 | 10K |
| set (7) | 2 configurations in Table 6-1 | 100L |

The Aggregation levels and candidates corresponding to Table 10 are shown in any one or a combination of Table 4-1, 4-2, 5-1, 5-2, 6-1.

In example 11, "B" is configured as the relative value, which is obtained by adding/subtracting a reference value to/from the step length or multiplying the reference value by an adjustment factor. For example, Table 11 is a corresponding table of specific coverage levels/repeat levels and reference repeat times.

Reference values of repeat times corresponding to the coverage levels/repeat levels are as shown in Table 11:

TABLE 11

| | Repeat times |
|---|---|
| Coverage level/repeat level 3 | N3 = 100 |
| Coverage level/repeat level 2 | N2 = 20 |
| Coverage level/repeat level 1 | N1 = 5 |

When "B" is configured for detecting four types of repeat times, the absolute value configured for the same coverage level is {80, 90, 110, 120}, and the relative value is configured as {N3−20, N3−10, N3+10, N3+20}, {80% N3, 90% N3, 110% N3, 120% N3} or {N3/8, N3/4, N3/2, N3}.

When "B" is configured for detecting three types of repeat times, the absolute value configured for different coverage levels is {10, 40, 200}, and the relative value is configured as {2N1, 2N2, 2N3}.

In example 12, "B" is configured as the relative value through a manner in which the coverage levels/repeat levels correspond to a set of repeat times without adding/subtracting an adjusting step length or multiplying an adjustment factor. For example, table 12 shows a specific corresponding table of coverage levels/repeat levels and sets of the repeat times.

The corresponding table of the coverage levels/repeat levels and the sets of the repeat times is shown in Table 12.

TABLE 12

| | Repeat times |
|---|---|
| Coverage level/repeat level 3 | N3 = {80, 100, 120, 140} |
| Coverage level/repeat level 2 | N2 = {10, 20, 40, 80} |
| Coverage level/repeat level 1 | N1 = {2, 5, 8, 10} |

Preferably, the set (A, B) of the detection parameters of the downlink control channel may be configured by configuring one of "A" and "B", and the other of "A" and "B" can be obtained impliedly.

More preferably, the above method of obtaining the other of "A" and "B" impliedly includes but not limited to the follows situations: a one-to-one correspondence exists between "A" and "B"; and a product of "A" and "B" in quantitative values is less than "Z", and a one-to-one correspondence exists among types.

For example, a one-to-one correspondence exists between "A" and "B", for example, the smaller aggregation levels correspond to smaller repeat times and larger aggregation levels correspond to larger repeat times, or the smaller aggregation levels correspond to the larger repeat times and the larger aggregation levels correspond to the smaller repeat times. The product of "A" and "B" in quantitative values is N1 or a sum of "A" and "B" is N2, and a one-to-one correspondence exists among the types. For example, if two types of aggregation levels are configured and N1 is equal to 8, then there are four types of repeat times accordingly, i.e., a one-to-one correspondence exists between the two types of aggregation levels and the four types of repeat times. As another example, if two types of aggregation levels are configured and N2 is equal to 4, then there are two types of repeat times accordingly, i.e., a one-to-one correspondence exists between the two types of aggregation levels and the types of repeat times.

Preferably, based on whether an RRC connection is established, the set of the detection parameters of the downlink control channel is configured by utilizing different high-level signaling, or search spaces of different types are configured. The high-level signaling includes SIB, RRC and RAR. The types of the search spaces include USS and CSS.

For example, the CSS is configured by utilizing the SIB before the RRC connection is established. The SIB herein refers to SIBx transmitted without control, preferably SIB1. The CSS at which the EPDCCH is located for other SIBx, RAR and Paging messages is configured. The USS may be configured by utilizing the RAR.

The USS is configured by utilizing the signaling RRC after the RRC connection is established. The RRC configuration herein may be merged with the EPDCCH configuration, that is, related parameters may be added into the existing EPDCCH configuration. If there are configurations PRB locations and numbers originally, configurations {aggregation levels, repeat times} may be added. A group of different {aggregation levels, repeat times} may be configured by considering coverage level factors during configuration.

1). Indication of {the number of PRBs, repeat times}: in this case, a one-to-one correspondence exists between the number of PRBs and the set of aggregation levels. For different coverage levels, there exist different one-to-one correspondences between the number of PRBs and the aggregation levels (The set of the repeat times are different with respect to different coverage levels).

2). Indication of {the number of PRBs, repeat levels}: in this case, a one-to-one correspondence exists between the number of PRBs and the set of aggregation levels, and a determined one-to-one correspondence exists among the set of the repeat times in the repeat levels. For different repeat levels, there exist different one-to-one correspondences between the number of PRBs and the aggregation levels (The set of the repeat times are different with respect to different repeat levels).

3). Indication of {the number of PRBs/aggregation levels, repeat levels, step length/adjustment factor}: in this case, the specific repeat times are determined by adding the following times of step length {−2, −1, +1, +2} to the reference repeat times corresponding to the repeat levels, or by multiplying the reference value by the following numerical value {½, ¾, 5/4, 3/2}. The step lengths are different with respect to different coverage levels.

Preferably, when the configuration is performed through the high-level signaling, the set (A, B) is configured according to the coverage levels/types of messages/types of the search spaces.

Preferably, the indication of "A" refers to one or a combination of indications to the aggregation levels or the number of PRBs. A one-to-one correspondence exists between different numbers of PRBs and the sets of the numbers of the aggregation levels used correspondingly. Preferably, the one-to-one correspondences are different with respect to different coverage levels, that is, the numbers of the aggregation levels corresponding to the same number of PRBs may be the same or different with respect to different coverage levels. Alternatively, the numbers of the aggregation levels corresponding to the same number of PRBs are the same, but types of specific aggregation levels may be the same, partially different or completely different with respect to different coverage levels.

Preferably, the indication of "B" refers to indication of one of repeat times, repeat levels and coverage levels or combined indication. When the coverage levels or the repeat levels are indicated, at least one of the followings should be clearly indicated or determined impliedly: a product of the reference repeat times corresponding to the coverage levels or the repeat levels and the adjustment factor; and a sum of or a difference between the reference repeat times corresponding to the coverage levels or the repeat levels and the step length. Preferably, the reference repeat times corresponding to different repeat levels or coverage levels meet a one-to-one correspondence, or the sets of the repeat times corresponding to different repeat levels or coverage levels meet a one-to-one correspondence. More preferably, elements in the sets of the repeat times corresponding to the different repeat levels or coverage levels are allowed to be partially the same.

Preferably, only the detection number is configured through configuring the set (A, B), and the specific aggregation levels and repeat times for detections are obtained impliedly.

More preferably, the strategy of obtaining impliedly includes but not limited to the followings: the specific repeat times/the sets of the repeat times and the types of the aggregation levels detected are obtained with reference to a configuration number in combination with the correspondence between the same coverage level/repeat levels and the specific numerical values; and the specific repeat times/the sets of the repeat times and the types of the aggregation levels detected are obtained with reference to the configuration number in combination with the correspondence between different coverage levels/repeat levels and numerical values.

Preferably, the search space in which the downlink control channel is located refers to two PRB sets. The first one of the two PRB sets is configured based on a constant aggregation level, and the second one of the two PRB sets is configured based on a constant repeat times.

For example, the two PRB sets may be completely overlapped in the frequency domain, e.g., the first set is configured by utilizing one type of aggregation level and four types of repeat times, and the second set is configured by utilizing four types of aggregation levels and one type of repeat times.

Set1: one type of aggregation level and four types of repeat times. For example, when a 6PRB set is configured, AL is equal to 24 and the repeat times refer to {10, 20, 40, 80}, and then candidates corresponding to the repeat times are as follows.

|  | repeat 10 times | repeat 20 times | repeat 40 times | repeat 80 times |
|---|---|---|---|---|
| Number of candidates | 1 | 1 | 1 | 1 |

Alternatively, the candidates corresponding to the repeat times are as follows.

|  | repeat 10 times | repeat 20 times | repeat 40 times | repeat 80 times |
|---|---|---|---|---|
| Number of candidates | 8 | 4 | 2 | 1 |

Set2: four types of aggregation levels and one type of repeat times. For example, when the 6PRB set is configured, AL is equal to one of 4, 8, 16 and 24 and the repeat times refer to 20, and then candidates corresponding to the aggregation levels are as follows.

|  | AL4 | AL8 | AL16 | AL24 |
|---|---|---|---|---|
| Number of candidates | 1 | 1 | 1 | 1 |

Alternatively, the candidates corresponding to the aggregation levels are as follows.

|  | AL4 | AL8 | AL16 | AL24 |
|---|---|---|---|---|
| Number of candidates | 6 | 3 | 1 | 1 |

Preferably, the aggregation levels and repeat times to be detected are obtained impliedly by the terminal by virtue of at least one of the following parameters:

coverage levels, repeat levels, PRB sets of the downlink control channel and the number of PRBs in the sets.

More preferably, the above method for obtaining the aggregation levels and repeat times to be detected impliedly includes but not limited to one or a combination of manners as follows: determining repeat times to be detected according to the coverage levels or the repeat levels; determining sets of repeat times to be detected according to the coverage levels or the repeat levels by the terminal; determining the number and types of aggregation levels to be detected according to the coverage levels or the repeat levels; determining the number and the types of aggregation levels to be detected according to the configured PRB sets and the number of PRBs in the sets; determining the number and the types of aggregation levels to be detected according to the repeat times/the sets of the repeat times to be detected; and determining the repeat times/the sets of the repeat times to be detected according to the number and the types of aggregation levels to be detected.

According to the transmission method for the downlink control channel proposed by the present disclosure, a reception problem of the aggregation levels and the repeat times of blind detection during repeated transmission of the MTC terminal with the limited reception bandwidth can be ensured, thereby ensuring the normal and effective communication of the MTC terminal.

The present disclosure is further described below by virtue of specific embodiments.

Specific Embodiment I

Transmission of the downlink control channel in the present embodiment is described in detail by adopting the method provided in the present disclosure.

Before a RRC connection is established, a set (A, B) is configured by a base station through pre-defined CSS. The "A" and "B" configured refer to aggregation levels and repeat times represented by absolute values.

The set (A, B) refers to two type of aggregation levels and four types of repeat times. In this case, to ensure that a worst terminal is within the cell coverage, {2 ALs, (80, 100, 160, 200)} is configured with respect to a coverage level 3 by the base station.

When there are two types of repeat times detections and two types of aggregation level detections, a sum of the candidates for each of the aggregation levels is 4 (an upper limit). Therefore, allocation based on a principle of "preferably ensuring that the candidates for the larger aggregation levels may completely occupy the located PRB set" is shown in the table below.

TABLE 1

|  | Number of M-PDCCH candidates $M_p^{(L)}$ | | | | |
|---|---|---|---|---|---|
| $N_{RB\_P}^X$ | L = 2 | L = 4 | L = 8 | L = 16 | L = 24 |
| 2 | 0 | 2 | 1 | 0 | 0 |
| 4 | 0 | 0 | 2 | 1 | 0 |
| 6 | 0 | 0 | 0 | 1 | 1 |

During the blind detection and reception of the downlink control channel, the terminal performs detections at four types of repeat times (i.e., 80, 100, 160 and 200), and performs blind detections on two types of aggregation levels with respect to each type of repeat times. For example, AL16 and AL24 are detected when the PRB set is configured to be 6. Control information before establishing the RRC connection is received by the CSS.

After the RRC connection is established, the set (A, B) of the USS is configured through the RRC signaling. The "A" and "B" configured refer to the aggregation levels and the repeat times represented by the absolute values. The set (A, B) refers to one type of aggregation level and three types of repeat times.

In this case, there is one candidate when the configured repeat times are 40; there are two candidates when the configured repeat times are 20; and there are four candidates when the configured repeat times are 10. The one type of aggregation level configured is AL24 with respect to 6PRB set, and the number of the candidate is 1. The control information after establishing the RRC connection is received by the USS.

According to the transmission method for the downlink control channel proposed by the present disclosure, the MTC terminal with limited reception bandwidth is ensured to, during the repeated transmission, perform blind detection on reception problem of different aggregation levels and repeat times configured before and after establishing the RRC connection, thereby ensuring the normal and effective communication of the MTC terminal.

Specific Embodiment II

Transmission of the downlink control channel in the present embodiment is described in detail by adopting the method provided in the present disclosure.

Before a RRC connection is established, a set (A, B) for the CSS is configured by a base station through a system information block SIB1. The "A" and "B" configured refer to aggregation levels and repeat times represented by absolute values.

The set (A, B) refers to two types of aggregation levels and four types of repeat times, and M=K=L=1, as shown in example 4.

The two types of aggregation levels and four types of repeat times are shown in Table 4.

TABLE 4

| High-level signaling configuration | Aggregation levels | Repeat times |
| --- | --- | --- |
| set (0) | 2 configurations in Table 4-2 | {1M, 2M, 4M, 8M} |
| set (1) | 2 configurations in Table 4-1 | {10K, 20K, 40K, 80K} |
| set (2) | 2 configurations in Table 4-1 | {100L, 150L, 200L, 300L} |

The aggregation levels and candidates corresponding to Table 4 are shown in Table 4-1 or 4-2.

When there are four types of repeat times detections and two types of aggregation level detections, a sum of the candidates for each of the aggregation levels is 4 (an upper limit). Therefore, allocation based on a principle of "preferably ensuring that the candidates for the larger aggregation levels may completely occupy the located PRB set" is shown in Table 4-1 as follows.

TABLE 4-1

| | Number of M-PDCCH candidates $M_p^{(L)}$ | | | | |
| --- | --- | --- | --- | --- | --- |
| $N_{RB}^{X_p}$ | L = 2 | L = 4 | L = 8 | L = 16 | L = 24 |
| 2 | 0 | 2 | 1 | 0 | 0 |
| 4 | 0 | 0 | 2 | 1 | 0 |
| 6 | 0 | 0 | 0 | 1 | 1 |

Alternatively, the largest bearable aggregation levels are not used under a small coverage condition, as shown in Table 4-2.

TABLE 4-2

| | Number of M-PDCCH candidates $M_p^{(L)}$ | | | | | |
| --- | --- | --- | --- | --- | --- | --- |
| $N_{RB}^{X_p}$ | L = 1 | L = 2 | L = 4 | L = 8 | L = 16 | L = 24 |
| 2 | 0 | 2 | 2 | 0 | 0 | 0 |
| 4 | 0 | 0 | 2 | 2 | 0 | 0 |
| 6 | 0 | 0 | 0 | 3 | 1 | 0 |

During blind detection and reception of the downlink control channel, if the reception configuration is set (1), then the PRB set is 6PRB. In this case, the terminal performs detections at four types of repeat times (i.e., 10, 20, 40 and 80), and performs blind detections on two types of aggregation levels (AL16 and AL24) with respect to each type of repeat times. Control information before establishing the RRC connection is received through the CSS.

After the RRC connection is established, the set (A, B) for the USS is configured through the RRC signaling. The "B" configured refers to the repeat times represented by the relative values. The set (A, B) refers to four types of aggregation levels and four types of repeat times.

"B" is configured with the relative value, which is obtained by adding/subtracting a reference value to/from a step length. A specific corresponding table of coverage levels/repeat levels and reference repeat times is shown in Table 11.

TABLE 11

| | Repeat times |
| --- | --- |
| Coverage level/repeat level 3 | N3 = 100 |
| Coverage level/repeat level 2 | N2 = 20 |
| Coverage level/repeat level 1 | N1 = 5 |

When "B" is configured for detecting four types of repeat times, the relative values configured is shown in Table 13, where the adjusting step length configured is preferably as follows: M=1, K=5, and L=10.

The four type of aggregation levels and four types of repeat times are shown in Table 13.

TABLE 13

| High-level signaling configuration | Aggregation levels | Repeat times |
| --- | --- | --- |
| set (0) | 4 types | {N1 − 2M, N1 − M, N1 + M, N1 + 2M} |
| set (1) | 4 types | {N2 − 2K, N2 − K, N2 + K, N2 + 2K} |
| set (2) | 4 types | {N3 − 2L, N3 − L, N3 + L, N3 + 2L} |

The aggregation levels and candidates corresponding to Table 13 are shown in Table 1-1 or 1-2.

TABLE 1-1

| | Number of M-PDCCH candidates $M_p^{(L)}$ | | | | |
| --- | --- | --- | --- | --- | --- |
| $N_{RB}^{X_p}$ | L = 2 | L = 4 | L = 8 | L = 16 | L = 24 |
| 2 | 1 | 2 | 1 | 0 | 0 |
| 4 | 1 | 1 | 1 | 1 | 0 |
| 6 | 0 | 1 | 1 | 1 | 1 |

TABLE 1-2

| | Number of M-PDCCH candidates $M_p^{(L)}$ | | | | | |
| --- | --- | --- | --- | --- | --- | --- |
| $N_{RB}^{X_p}$ | L = 1 | L = 2 | L = 4 | L = 8 | L = 16 | L = 24 |
| 2 | 1 | 1 | 1 | 1 | 0 | 0 |
| 4 | 0 | 1 | 1 | 1 | 1 | 0 |
| 6 | 0 | 0 | 1 | 1 | 1 | 1 |

During blind detection and reception of the downlink control channel by the terminal, if the reception configuration is set (2), then the PRB set is 6PRB. In this case, the terminal performs the detections at four types of repeat times (i.e., 80, 90, 110 and 120), and performs blind detections on four types of aggregation levels (i.e., AL4, ALB, AL16 and AL24) with respect to each type of repeat times. Control information after establishing the RRC connection is received through the USS.

Then, there is one candidate when the repeat times configured are 40; there are two candidates when the repeat times configured are 20; and there are four candidates when the repeat times configured are 10. The one type of aggregation level configured is AL24 as for the 6PRB set, and the number of the candidate is 1. The control information after establishing the RRC connection is received through the USS.

Preferably, after the repeat times of the downlink control channel are detected by the terminal, based on the actual detected repeat times of the downlink control channel and correspondence between the repeat times of the downlink control channel and the repeat times of other channels, the repeat times of other channels may be obtained impliedly by the terminal. Other channels include at least one of the followings: a physical downlink share channel (PDSCH), a physical uplink share channel (PUSCH) and a physical uplink control channel (PUCCH).

The following contents are added in description. A correspondence among the repeat times of different channels is shown in Table 14.

TABLE 14

|  | Correspondence | | | |
| --- | --- | --- | --- | --- |
|  | EPDCCH | PDSCH | PUSCH | PUCCH |
|  | Repeat times | | | |
|  | N1 | N2 | N3 | N4 |
| Example 1 | 100 | 300 | 200 | 20 |
| Example 2 | 10 | 20 | 20 | 2 |

For example, multiple type of repeat times of the downlink control channel are configured, but only one type of specific repeat times is actually detected by the terminal. The repeat times of the PDSCH can be further obtained impliedly according to the detected repeat times of the EPDCCH (which is the only one being determined) and a correspondence table of the repeat times.

Figure 4:
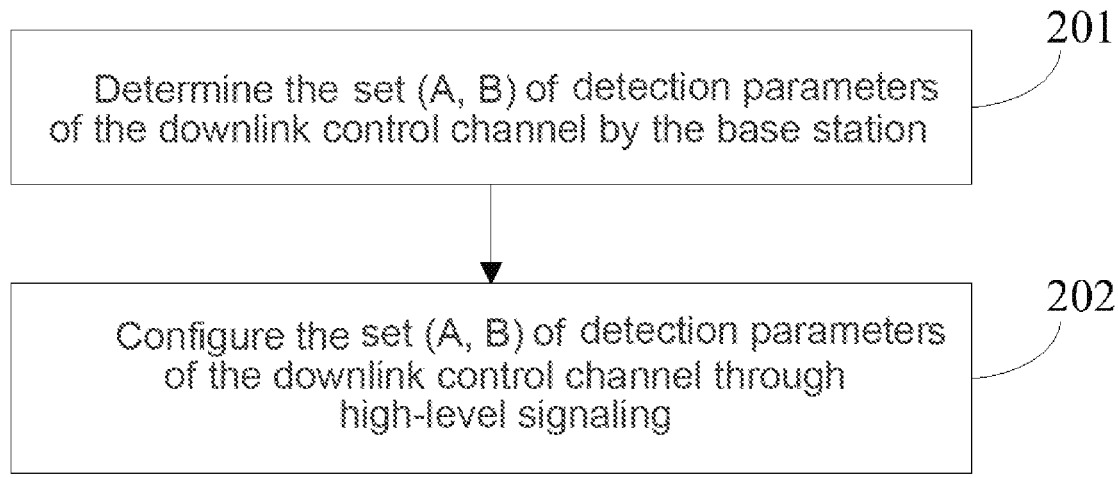
FIG. 4 is a schematic diagram illustrating a realization process of a configuration method for a downlink control channel in embodiments of the present disclosure.

Corresponding to the transmission method for the downlink control channel applied to the terminal side, embodiments of the present disclosure further provide a configuration method for the downlink control channel. The configuration method is applied to the base station side, and includes the following steps as shown in FIG. 4.

In step 201, a set (A, B) of detection parameters of the downlink control channel is determined by the base station.

In step 202, the set (A, B) of detection parameters of the downlink control channel is configured through high-level signaling.

"A" represents the number of physical resource block (PRB) sets or aggregation levels, and "B" represents the repeat times, the repeat levels or the coverage levels.

"A" is set so that the same number of aggregation levels are configured for each coverage condition, and it is supported that partial aggregation levels are different. Alternatively, "A" is set so that corresponding aggregation levels are impliedly obtained based on the number of the PRBs.

"B" is set as an absolute value or a relative value. The absolute value refers to a specific repeat times, and the relative value is obtained by multiplying reference repeat times corresponding to the coverage levels/the repeat levels by an adjustment quantity, or obtained by adding/subtracting the reference repeat times corresponding to the coverage levels/the repeat levels to/from a step length.

Preferably, the step of configuring, by the base station, the set (A, B) of detection parameters of the downlink control channel through the high-level signaling includes the followings.

Based on whether the RRC connection is established, the base station configures the set of detection parameters of the downlink control channel through different high-level signalings, and configures different types of search spaces of the downlink control channel. The high-level signaling includes SIB, RRC and RAR. The types of search spaces include USS and CSS.

Preferably, the step of configuring, by the base station, the set (A, B) of detection parameters of the downlink control channel through the high-level signaling includes the followings.

The set (A, B) is configured by the base station according to at least one of the coverage levels, the types of messages and the types of the search spaces when being configured through the high-level signaling.

Preferably, the step of configuring, by the base station, the set (A, B) of detection parameters of the downlink control channel through the high-level signaling includes the followings.

"A" is indicated by the base station in the following manners: indicated by either the aggregation levels or the number of the PRBs or a combination thereof. A one-to-one correspondence exists between different numbers of PRBs and sets of numbers of the aggregation levels used correspondingly.

Preferably, the step of configuring, by the base station, the set (A, B) of detection parameters of the downlink control channel through the high-level signaling includes the followings.

When "A" is indicated as different coverage levels by the base station, the one-to-one correspondences between different numbers of PRBs and the sets of numbers of the aggregation levels used correspondingly are different. The number of the aggregation levels corresponding to the same number of PRBs may be the same or different with respect to different coverage levels. Alternatively, the number of the aggregation levels corresponding to the same number of PRBs is the same, and specific types of aggregation levels may be the same, partially different or completely different with respect to different coverage levels.

Preferably, the step of configuring, by the base station, the set (A, B) of detection parameters of the downlink control channel through the high-level signaling includes the followings.

"B" is indicated by the base station in the following manners: indicated by any one of the repeat times, the repeat levels, the coverage levels, the adjustment quantity and the step length or a combination thereof.

Preferably, the step of configuring, by the base station, the set (A, B) of detection parameters of the downlink control channel through the high-level signaling includes the followings.

The base station indicates that a one-to-one correspondence exists between different repeat levels/coverage level and the reference repeat times; a one-to-one correspondence exists between different repeat levels/coverage levels and the sets of the repeat times; and a one-to-one correspondence exists between different repeat levels/coverage levels and the repeat times.

Corresponding to the transmission method for the downlink control channel applied to the terminal side, embodiments of the present disclosure further provide a terminal.

Figure 5:
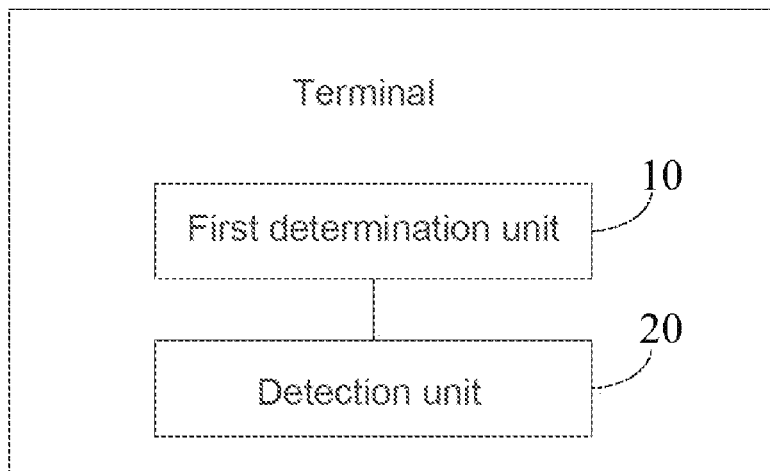
FIG. 5 is a structural schematic diagram illustrating a terminal in embodiments of the present disclosure.

As shown in FIG. 5, the terminal includes a first determination unit 10 and a detection unit 20.

The first determination unit 10 is configured to determine a maximum number N_total of candidates of the downlink control channel in a repeated transmission.

The detection unit 20 is configured to detect the downlink control channel according to the maximum number N_total of the candidates in the repeated transmission.

The maximum number N_total of the candidates meets one of the following conditions:

the maximum number N_total of the candidates is not greater than a maximum blind detection number N_legacy of single-subframe for a legacy UE;

the maximum number N_total of the candidates is a product (N_legacy×Y) of the total blind detection number N_legacy of single-subframe for the legacy UE and a maximum value Y of types of repeat times for performing the blind detection on the downlink control channel; and the maximum number N_total of the candidates ranges from N_legacy to N_legacy×Y.

Preferably, the maximum blind detection number of is a maximum number of blind detections performed with respect to the USS only, a maximum number of blind detections performed with respect to the CSS only, or a maximum number of blind detections performed with respect to the USS and the CSS.

Preferably, there are at most X types of aggregation levels for performing detection on the downlink control channel, where X is an integer greater than or equal to 1, and Y is an integer greater than or equal to 1.

Preferably, X×Y≤Z, Z is equal to (N_total)/2 or N_total.

Preferably, the maximum value of a sum of numbers of candidates corresponding to each of the aggregation levels of the downlink control channel is Z/Y. The maximum value of a sum of numbers of candidates corresponding to each of the repeat times of the downlink control channel is Z/X.

Preferably, the repeat times and the aggregation levels adopted in detection of the downlink control channel are determined through at least one of the following manners: being determined through pre-definition; being determined through SIB configuration; being determined through RAR configuration and being determined through RRC signaling configuration.

Preferably, a principle of allocating numbers of the candidates to X types of aggregation levels includes at least one of the followings.

When X is greater than 1, it is preferably ensured that the number of the candidates for higher aggregation level completely occupies the located physical resource block set (PRB set).

Alternatively, when X is greater than 1, the number of the candidates allocated to the first aggregation level is not less than the number of the candidates allocated to the second aggregation level. With respect to the X types of aggregation levels detected, there exists at least one candidate, and resources occupied by the first aggregation level are less than resources occupied by the second aggregation level.

Preferably, when X is equal to 1, the aggregation level adopts the highest aggregation level (AL=24) enhanced control channel element (ECCE) and the 6PRB set completely occupies the search space, ECCE mapping is performed with respect to 2 or 3 sub-sets by the base station through the per-defined configuration or through the high-level signaling configuration respectively.

The 2 sub-sets refer to 2PRB and 4PRB respectively. Based on an ascending order of serial numbers of the PRBs, the ECCE mapping is preferably performed in a sub-set having a PRB with the minimum serial number.

Preferably, a principle of allocating numbers of the candidates for Y types of repeat times by the base station includes at least one of the followings:

when Y is greater than 1, the candidates of the maximum repeat times is 1; and when Y is greater than 1, the number of the candidates of a first repeat times is not less than the number of the candidates of a second repeat times, and the first repeat times is less than the second repeat times. With respect to each of the repeat times in the Y types of repeat times detected, there exists at least one candidate.

Preferably, a set (A, B) of detection parameters of the downlink control channel is configured by the base station through the high-level signaling, where "A" represents the number of the configured aggregation levels or PRBs, and "B" represents the configured repeat times, repeat levels or coverage levels.

"A" is set so that the same number of aggregation levels are configured for each coverage condition, and it is supported that partial aggregation levels are different. Alternatively, "A" is set so that corresponding aggregation levels are impliedly obtained based on the number of the PRBs.

"B" is set as an absolute value or a relative value. The absolute value refers to a specific repeat times, and the relative value is obtained by multiplying reference repeat times corresponding to the coverage levels/the repeat levels by an adjustment quantity, or obtained by adding the reference repeat times to a step length/subtracting the step length from the reference repeat times.

Preferably, the detection unit 20 is further configured as follows: one of "A" and "B" is set, and the other one of "A" and "B" is obtained impliedly through an implied relation between "A" and "B".

Preferably, the implied relation between "A" and "B" includes: a one-to-one correspondence exists between "A" and "B"; a product of "A" and "B" in quantitative values is N1 or a sum of "A" and "B" is N2; and a one-to-one correspondence exists between types of "A" and "B".

Preferably, based on whether an RRC connection is established, the set of the detection parameters of the downlink control channel is configured by the base station through utilizing different high-level signaling, or search spaces of different types are configured by the base station. The high-level signaling includes SIB, RRC and RAR. The types of the search spaces include USS and CSS.

Preferably, the set (A, B) is configured by the base station according to at least one of the coverage levels, types of messages and types of search spaces when being configured through the high-level signaling.

Preferably, the first determination unit 10 is further configured to acquire an indication of "A" from the base station. The indication of "A" from the base station indicates either the aggregation levels or the number of the PRBs or a combination thereof. A one-to-one correspondence exists between different numbers of PRBs and sets of numbers of the aggregation levels used correspondingly.

Preferably, when "A" is indicated as different coverage levels by the base station, the one-to-one correspondences between different numbers of PRBs and the sets of numbers of the aggregation levels used correspondingly are different. The number of the aggregation levels corresponding to the same number of PRBs may be the same or different with respect to different coverage levels. Alternatively, the number of the aggregation levels corresponding to the same number of PRBs is the same, and specific types of aggregation levels may be the same, partially different or completely different with respect to different coverage levels.

Preferably, the first determination unit 10 is further configured to acquire an indication of "B" from the base station. The indication of "B" from the base station indicates any one of the repeat times, the repeat levels, the coverage levels, the adjustment quantity and the step length or a combination thereof.

The first determination unit 10 is further configured to acquire the repeat times indicated by the base station in an explicit manner. Alternatively, the first determination unit 10 is further configured to acquire the repeat times in the following manners: determining the reference repeat times corresponding to the repeat levels and/or the coverage levels indicated by the terminal by utilizing the coverage levels, the repeat levels, the adjustment quantity and the step length indicated by the base station in a combined manner and the implied relation; obtaining the repeat times by multiplying the reference repeat times by the adjustment quantity, or by adding/subtracting the reference repeat times to/from the step length.

Preferably, the implied relation includes the followings:
there exists one-to-one correspondence between different repeat levels/coverage levels and the reference repeat times; there exists one-to-one correspondence between different repeat levels/coverage levels and the sets of the repeat times; and elements in the sets of the repeat times corresponding to different repeat levels/coverage levels are partially the same.

Preferably, the first determination unit 10 is further configured to obtain the aggregation levels and repeat times detected based on the implied strategy when the set (A, B) is configured by the base station and only the detection number is configured.

Preferably, the first determination unit 10 is configured to obtain the aggregation levels and repeat times detected based on the implied strategy, through at least one of the following manners:

obtaining the specific sets of the repeat times and the types of aggregation levels detected according to the configured numbers in combination with correspondence of specific numerical values of the same repeat level and repeat times;

obtaining, by the terminal, the specific repeat times and the types of aggregation levels detected according to the configured numbers in combination with correspondence of specific numerical values of different coverage levels and repeat times; and obtaining the specific sets of the repeat times and the types of aggregation levels detected according to the configured numbers in combination with correspondence of specific numerical values of different coverage levels and repeat levels.

Preferably, the search space in which the downlink control channel is located refers to two PRB sets. The first one of the two PRB sets is configured based on a constant aggregation level, and the second one of the two PRB sets is configured based on a constant repeat times.

Preferably, the detection unit 20 is further configured to obtain the aggregation levels and repeat times to be detected through at least one of the following parameters: coverage levels, repeat levels, PRB sets of the downlink control channel and the number of PRBs in the sets.

Preferably, the detection unit 20 is further configured to obtain the aggregation levels and repeat times to be detected through at least one of the following manners:

determining the repeat times to be detected according to the coverage levels or the repeat levels;

determining a set of the repeat times to be detected according to the coverage levels or the repeat levels;

determining the number and types of the aggregation levels to be detected according to the coverage levels or the repeat levels;

determining the number and types of the aggregation levels to be detected according to the a set of PRBs configured and the number of PRBs in the set;

determining the number and types of the aggregation levels to be detected according to the repeat times detected or the set of the repeat times; and determining the repeat times to be detected or a the set of the repeat times according to the number and the types of the aggregation levels detected.

As an embodiment, the detection unit 20 is further configured to impliedly determine, based on the actual detected repeat times of the downlink control channel and correspondence between the repeat times of the downlink control channel and the repeat times of other channels, the repeat times corresponding to other channels. Other channels include at least one of the followings: a physical downlink share channel (PDSCH), a physical uplink share channel (PUSCH) and a physical uplink control channel (PUCCH).

Each unit in the terminal may be realized by a processor, a micro controller unit (MCU), a field programmable gate array (FPGA) or an application specific integrated circuit (ASIC).

Figure 6:
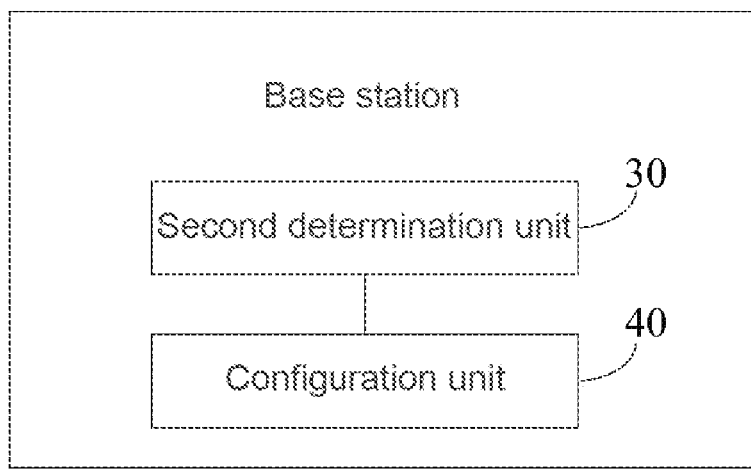
FIG. 6 is a structural schematic diagram illustrating a base station in embodiments of the present disclosure.

Corresponding to the configuration method for the downlink control channel applied to the base station side, embodiments of the present disclosure further provide a base station. As shown in FIG. 6, the base station includes a second determination unit 30 and a configuration unit 40.

The second determination unit 30 is configured to determine a set (A, B) of the detection parameters of the downlink control channel The configuration unit 40 is configured to configure the set (A, B) of detection parameters of the downlink control channel through the high-level signaling.

"A" represents the number of the aggregation levels or number of the set of PRBs, and "B" represents the repeat times, repeat levels or coverage levels.

"A" is set so that the same number of aggregation levels are configured for each coverage condition, and it is supported that partial aggregation levels are different. Alternatively, "A" is set so that corresponding aggregation levels are impliedly obtained based on the number of the PRBs.

"B" is set as an absolute value or a relative value. The absolute value refers to a specific repeat times, and the relative value is obtained by multiplying reference repeat times corresponding to the coverage levels/the repeat levels by an adjustment quantity, or obtained by adding/subtracting the reference repeat times corresponding to the coverage levels/the repeat levels to/from a step length.

Preferably, the configuration unit 40 is further configured to, based on whether an RRC connection is established, configure the set of the detection parameters of the downlink control channel through different high-level signaling, or configure search spaces of different types of the downlink control channel. The high-level signaling includes SIB, RRC and RAR. The types of the search spaces include USS and CSS.

Preferably, the configuration unit 40 is further configured to configure the set (A, B) through the high-level signaling according to at least one of the coverage levels, types of messages and types of the search space.

Preferably, the configuration unit 40 is further configured to indicate "A" in the following manners: indication of either the aggregation levels or the number of PRBs or a combination thereof. A one-to-one correspondence exists between different numbers of PRBs and sets of numbers of the aggregation levels used correspondingly.

Preferably, when "A" is indicated as different coverage levels by the base station, the one-to-one correspondences between different numbers of PRBs and the sets of numbers of the aggregation levels used correspondingly are different. The number of the aggregation levels corresponding to the same number of PRBs may be the same or different with respect to different coverage levels. Alternatively, the number of the aggregation levels corresponding to the same number of PRBs is the same, and specific types of aggregation levels may be the same, partially different or completely different with respect to different coverage levels.

Preferably, the configuration unit 40 is further configured to indicate "B" in the following manners: indication of any one of the repeat times, the repeat levels, the coverage levels, the adjustment quantity and the step length or a combination thereof.

Preferably, there exists one-to-one correspondence between different repeat levels/coverage levels and the reference repeat times; there exists one-to-one correspondence between different repeat levels/coverage levels and the sets of the repeat times; and the repeat times corresponding to different repeat levels/coverage levels are partially the same.

Each unit in the base station may be realized by a processor, a micro controller unit (MCU), a field programmable gate array (FPGA) or an application specific integrated circuit (ASIC).

According to the transmission method and the configuration method for the downlink control channel, the terminal and the base station proposed by the present disclosure, a reception problem of the aggregation levels and the repeat times of blind detection with different configurations before and after the establishment of the RRC connection during the repeated transmission of the MTC terminal with the limited reception bandwidth can be ensured, thereby ensuring the normal and effective communication of the MTC terminal.

Embodiments of the present disclosure further provide a computer storage medium. An executable instruction is stored in the computer storage medium, and is used for executing the transmission method for the downlink control channel shown in FIG. 1 or the configuration method for the downlink control channel shown in FIG. 4.

Those ordinary skilled in the art should understand that total or partial steps for realizing embodiments of the above method may be completed by virtue of program command related hardware. The above program may be stored in a computer readable storage medium. Steps including embodiments of the above method are executed when the program is executed; while the above storage medium includes a movable storage device, a random access memory (RAM), a read-only memory (ROM), a disk or a CD-ROM and other various media capable of storing program codes.

Alternatively, when the above integrated unit in the present disclosure is realized in a form of a software function module and serves as an independent product to be sold or used, the integrated unit may be stored in the computer readable storage medium. Based on such an understanding, substantially a technical solution of embodiments of the present disclosure or a part making a contribution to the existing art may be reflected in a form of a software product. The computer software product is stored in a storage medium and includes a plurality of instructions used for enabling a computer device (may be a personal computer, a server or a network device and the like) to execute the total or partial of the method in each embodiment of the present disclosure. However, the above storage medium includes the movable storage device, the RAM, the ROM, the disk or the CD-ROM and other various media capable of storing the program codes.

The above describes only specific embodiments of the present disclosure, but a scope of protection of the present disclosure is not limited herein. Any of those skilled in the art may easily think of changes or replacements in a technical scope disclosed in the present disclosure, and the changes or replacements may be included in the scope of protection of the present disclosure. Therefore, the scope of protection of the present disclosure should be based on a scope of protection of claims.

What is claimed is:

1. A transmission method for a downlink control channel, comprising:
performing, by a terminal, a blind detection on the downlink control channel based on a maximum number (N_total) of candidates in a repeated transmission,
wherein the N_total meets at least one of the following conditions:
the N_total is not greater than a maximum blind detection number (N_legacy) of a single subframe of a transmission terminal (legacy UE) of a long-term evolution (LTE) system;
the N_total is N_legacy×Y which is a product of the N_legacy and a maximum value Y of types of repeat times for performing the blind detection on the downlink control channel; or
the N_total ranges from the N_legacy to the N_legacy× Y,
wherein the N_legacy is a maximum number of blind detections performed with respect to a UE-specific search space (USS); and
wherein at most X types of aggregation levels are used for performing detection on the downlink control channel, wherein X is an integer greater than or equal to 1, and Y is an integer greater than or equal to 1; X×Y≤Z, wherein Z is equal to (N_total)/k, wherein k is an integer greater than or equal to 1.

2. The method of claim 1, wherein the repeat times and the aggregation levels used for performing detection on the downlink control channel are determined by at least one of: pre-definition; system information block (SIB); random access response (RAR); or radio resource control (RRC) signaling.

3. The method of claim 1, wherein allocating the number of the candidates to the X types of aggregation levels includes at least one of:
in response to X being greater than 1, the number of the candidates for higher aggregation levels completely occupies a located physical resource block set (PRB set); or
in response to X being greater than 1, the number of the candidates allocated to a first aggregation level is not less than the number of the candidates allocated to a second aggregation level, wherein resources occupied by the first aggregation level are less than resources occupied by the second aggregation level;
wherein each of the X types of aggregation levels detected corresponds to at least one candidate.

4. The method of claim 1, wherein in response to X being equal to 1 and the aggregation level adopting the highest aggregation level (AL=24) as an enhanced control channel element (ECCE), and 6PRB set completely occupying a search space, the 6PRB set is used to configure mapping through per-definition or high-level signaling, and wherein configuring the mapping comprises at least one of:

performing ECCE mapping in the 6PRB set by utilizing two sub-sets respectively;

performing the ECCE mapping in the 6PRB set by utilizing three sub-sets respectively;

performing the ECCE mapping in the 6PRB set directly; or performing the ECCE mapping by utilizing 6PRB of a 8PRB set, wherein the high-level signaling indicates one of the ECCE mappings with two bits, or indicates any two of the ECCE mappings with one bit.

5. The method of claim 4, wherein the ECCE mapping is performed in a sub-set having a PRB with the minimum serial number based on an ascending order of serial number of the PRBs, the ECCE mapping further comprising: the ECCE mapping is performed in the 6PRB set by utilizing two sub-sets respectively, and the two sub-sets are 2PRB and 4PRB respectively; or the ECCE mapping is performed in the 6PRB set by utilizing three sub-sets respectively, and the three sub-sets are 2PRB, 2PRB and 2PRB respectively;

wherein in response to the ECCE mapping performed in the 6PRB set by utilizing two sub-sets 2PRB and 4PRB respectively and the sub-set in which the PRB with the minimum serial number is located is the 2PRB, 0-7ECCE are numbered in the 2PRB and 8-23ECCE are numbered in the 4PRB, wherein the number of the 2PRB in a frequency domain is lower than the number of the 4PRB in the frequency domain with respect to the two sub-sets in the 6PRB set.

6. The method of claim 1, wherein allocating the number of the candidates to Y types of repeat times comprises at least one of:

in response to Y being greater than 1, the number of the candidates for the maximum repeat times is 1; or in response to Y being greater than 1, the number of the candidates for a first repeat times is not less than the number of the candidates for a second repeat times, and the first repeat times is less than the second repeat times;

wherein each of the repeat times in the Y types of repeat times detected at least corresponds to one candidate.

7. The method of claim 1, wherein a set (A, B) of detection parameters of the downlink control channel is configured by a base station through high-level signaling, wherein a plurality of different sets (A, B) include different numbers, and the high-level signaling is used for indicating one of the numbers and configuring the set (A, B) corresponding to the number;

wherein "A" represents a total number of the aggregation levels or the PRBs configured, and "B" represents at least one of: repeat times; repeat levels; or coverage levels.

8. The method of claim 7, wherein in response to being configured through the high-level signaling, the set (A, B) of detection parameters of the downlink control channel is configured by the base station based on at least one of the coverage levels, types of messages or types of the search spaces, wherein:

"A" is configured such that a same number of aggregation levels is configured for each coverage condition, and it is supported that partial aggregation levels are different;

or "A" is configured such that corresponding aggregation levels are implicitly obtained by the number of the PRBs; and "B" is configured to be an absolute value or a relative value, wherein the absolute value includes a determined repeat times, and the relative value is obtained by multiplying reference repeat times corresponding to the coverage levels and the repeat levels by an adjustment quantity, by adding a step length to the reference repeat times, or by subtracting the step length from the reference repeat times.

9. The method of claim 1, further comprising obtaining, based on at least one of coverage levels, repeat levels, PRB set of the downlink control channel or the number of the PRBs in the PRB set, the aggregation levels and the repeat times to be detected by the terminal, wherein obtaining the aggregation levels and the repeat times to be detected comprises at least one of:

determining, by the terminal, the repeat times detected based on the coverage levels or the repeat levels;

determining, by the terminal, the set of the repeat times detected based on the coverage levels or the repeat levels;

determining, by the terminal, the number and types of the aggregation levels detected based on the coverage levels or the repeat levels;

determining, by the terminal, the number and the types of the aggregation levels detected based on the configured PRB set and the number of PRBs in the PRB set;

determining, by the terminal, the number and the types of the aggregation levels detected based on the repeat times or the set of the repeat times detected; or determining, by the terminal, the repeat times or the set of the repeat times detected based on the number and the types of the aggregation levels detected.

10. A terminal, comprising:

a determination unit configured to determine a maximum number (N_total) of candidates of a downlink control channel in a repeated transmission; and a detection unit configured to perform a blind detection on the downlink control channel of the N_total of the candidates in the repeated transmission, wherein the N_total meets at least one of the following conditions:

the N_total is not greater than a maximum blind detection number (N_legacy) of a single subframe of a transmission terminal (legacy UE) of a long-term evolution (LTE) system;

the N_total is N_legacy×Y which is a product of the N_legacy and a maximum value Y of types of repeat times for performing the blind detection on the downlink control channel; or the N_total ranges from the N_legacy to the N_legacy×Y, wherein the N_legacy is a maximum number of blind detections performed with respect to a UE-specific search space (USS);

wherein at most X types of aggregation levels are used by the detection unit to perform the detection on the downlink control channel, wherein X is an integer greater than or equal to 1, Y is an integer greater than or equal to 1, and X×Y≤Z; and Z is equal to (N_total)/2 or N_total.

11. The terminal of claim 10, wherein the determination unit is further configured to determine the repeat times and the aggregation levels for performing the detection on the downlink control channel by at least one of: pre-definition;

system information block (SIB); random access response (RAR) or radio resource control (RRC) signaling.

12. The terminal of claim 10, wherein allocating the number of the candidates to the X types of aggregation levels includes at least one of:
   in response to X being greater than 1, the number of the candidates for higher aggregation levels completely occupies a located physical resource block set (PRB set); or
   in response to X being greater than 1, the number of the candidates allocated to a first aggregation level is not less than the number of the candidates allocated to a second aggregation level, each of the X types of aggregation levels detected corresponds to at least one candidate, wherein resources occupied by the first aggregation level are less than resources occupied by the second aggregation level.

13. The terminal of claim 10, wherein in response to X being equal to 1 and the highest aggregation level (AL=24) adopted by the detection unit for performing the detection on the downlink control channel is an enhanced control channel element (ECCE), and 6PRB set completely occupies a search space, the 6PRB set is used to configure mapping through per-definition or high-level signaling, and wherein configuring the mapping comprises at least one of:
   performing ECCE mapping in the 6PRB set by utilizing two sub-sets respectively;
   performing the ECCE mapping in the 6PRB set by utilizing three sub-sets respectively;
   performing the ECCE mapping in the 6PRB set directly; or
   performing the ECCE mapping by utilizing 6PRB of a 8PRB set,
   wherein the high-level signaling indicates one of the ECCE mappings with two bits, or indicates any two of the ECCE mappings with one bit.

14. The terminal of claim 13, wherein the ECCE mapping is performed in a sub-set having a PRB with the minimum serial number based on an ascending order of serial number of the PRBs, the ECCE mapping further comprising: the ECCE mapping is performed in the 6PRB set by utilizing two sub-sets respectively, and the two sub-sets are 2PRB and 4PRB respectively; the ECCE mapping is performed in the 6PRB set by utilizing three sub-sets respectively, and the three sub-sets are 2PRB, 2PRB and 2PRB respectively;
   wherein in response to the ECCE mapping performed in the 6PRB set by utilizing two sub-sets 2PRB and 4PRB respectively and the sub-set in which the PRB with the minimum serial number is located is the 2PRB, 0-7ECCE are numbered in the 2PRB and 8-23ECCE are numbered in the 4PRB,
   wherein the number of the 2PRB in a frequency domain is lower than the number of the 4PRB in the frequency domain with respect to the two sub-sets in the 6PRB set.

15. The terminal of claim 10, wherein allocating the number of the candidates to Y types of repeat times comprises at least one of:
   in response to Y being greater than 1, the number of the candidates for the maximum repeat times is 1; or
   in response to Y being greater than 1, the number of the candidates for a first repeat times is not less than the number of the candidates for a second repeat times, and the first repeat times is less than the second repeat times; wherein each of the repeat times in the Y types of repeat times detected corresponds to at least one candidate.

16. The terminal of claim 10, wherein a set (A, B) of detection parameters of the downlink control channel is configured by a base station through high-level signaling, wherein:
   a plurality of different sets (A, B) include different numbers, and the high-level signaling is used for indicating one of the numbers and configuring the set (A, B) corresponding to the number;
   wherein "A" represents a total number of the aggregation levels or the PRBs configured, and "B" represents at least one of: repeat times; repeat levels; or coverage levels.

17. The terminal of claim 16, wherein:
   "A" is configured such that a same number of aggregation levels is configured for each coverage condition, and it is supported that partial aggregation levels are different; or "A" is configured such that corresponding aggregation levels are implicitly obtained by the number of the PRBs; and
   "B" is configured to be an absolute value or a relative value, wherein the absolute value includes a determined repeat times, and the relative value is obtained by multiplying reference repeat times corresponding to the coverage levels and the repeat levels by an adjustment quantity, by adding a step length to the reference repeat times, or by subtracting the step length from the reference repeat times.

18. The terminal of claim 10, wherein the detection unit is further configured to obtain, based on at least one of coverage levels, repeat levels, PRB set of the downlink control channel or the number of the PRBs in the PRB set, the aggregation levels and the repeat times to be detected, wherein obtaining the aggregation levels and the repeat times to be detected comprises at least one of:
   determining the repeat times detected based on the coverage levels or the repeat levels;
   determining the set of the repeat times detected based on the coverage levels or the repeat levels;
   determining the number and types of the aggregation levels detected based on the coverage levels or the repeat levels;
   determining the number and the types of the aggregation levels detected based on the configured PRB set and the number of PRBs in the PRB set;
   determining the number and the types of the aggregation levels detected based on the repeat times or the set of the repeat times detected; or
   determining the repeat times or the set of the repeat times detected based on the number and the types of the aggregation levels detected.

* * * * *